(12) United States Patent
Hipwell, Jr. et al.

(10) Patent No.: US 7,277,257 B2
(45) Date of Patent: Oct. 2, 2007

(54) TRANSDUCER-LEVEL MICROACTUATOR FOR A MAGNETIC RECORDING SYSTEM

(75) Inventors: Roger L. Hipwell, Jr., Eden Prairie, MN (US); Kyle M. Bartholomew, St. Louis Park, MN (US); Lance E. Stover, Eden Prairie, MN (US); Wayne A. Bonin, North Oaks, MN (US); Jeremy A. Thurn, Osseo, MN (US); Zine-Eddine Boutaghou, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 388 days.

(21) Appl. No.: 10/729,472

(22) Filed: Dec. 5, 2003

(65) Prior Publication Data

US 2005/0122630 A1 Jun. 9, 2005

(51) Int. Cl.
*G11B 5/56* (2006.01)
*G11B 21/21* (2006.01)

(52) U.S. Cl. .............................. 360/294.3; 360/234.7
(58) Field of Classification Search .. 360/294.1–294.7, 360/234.7, 235.7, 236.5
See application file for complete search history.

(56) References Cited

U.S. PATENT DOCUMENTS

| 5,364,742 | A | 11/1994 | Fan et al. | |
|---|---|---|---|---|
| 5,898,541 | A | 4/1999 | Boutaghou et al. | |
| 6,239,947 | B1 | 5/2001 | Fan et al. | |
| 6,249,402 | B1 | 6/2001 | Katayama | |
| 6,362,542 | B1 | 3/2002 | Novotny | |
| 6,487,045 | B1 | 11/2002 | Yanagisawa | |
| 6,683,757 | B1 * | 1/2004 | Bonin et al. | 360/294.3 |
| 6,697,232 | B1 * | 2/2004 | Hipwell et al. | 360/294.5 |
| 6,785,086 | B1 * | 8/2004 | Bonin et al. | 360/78.05 |
| 2001/0038515 | A1 | 11/2001 | Koganezawa et al. | |
| 2002/0075600 | A1 | 6/2002 | Schnur et al. | |
| 2002/0159192 | A1 | 10/2002 | Wada et al. | |
| 2003/0161071 | A1 | 8/2003 | Bonin et al. | |

OTHER PUBLICATIONS

U.S. Appl. No. 09/733,351, filed Dec. 8, 2000, Bonin et al.
U.S. Appl. No. 09/809,378, filed Mar. 15, 2001, Hipwell, Jr. et al.
U.S. Appl. No. 09/815,679, filed Mar. 23, 2001, Bonin et al.

* cited by examiner

*Primary Examiner*—Craig A. Renner
(74) *Attorney, Agent, or Firm*—Kinney & Lange, P.A.

(57) ABSTRACT

A transducer-level microactuator selectively positions a transducer portion of a slider radially with respect to circumferential data tracks of a rotatable disc. The slider includes a slider body having a leading edge and a trailing edge, a transducer body and a flexure body. The transducer body is spaced from the trailing edge of the sliding body and includes at least one transducer element. The flexure body extends from the trailing edge of the slider body and includes a first anchor point connected to the slider body and a second anchor point connected to the transducer body. The basecoat layer is deposited on the trailing edge of the slider body and substantially surrounds the flexure body wherein a gap separates the flexure body from the basecoat. A first actuation assembly is formed on the basecoat and a second actuation assembly is formed on the transducer body adjacent the slider body.

36 Claims, 19 Drawing Sheets

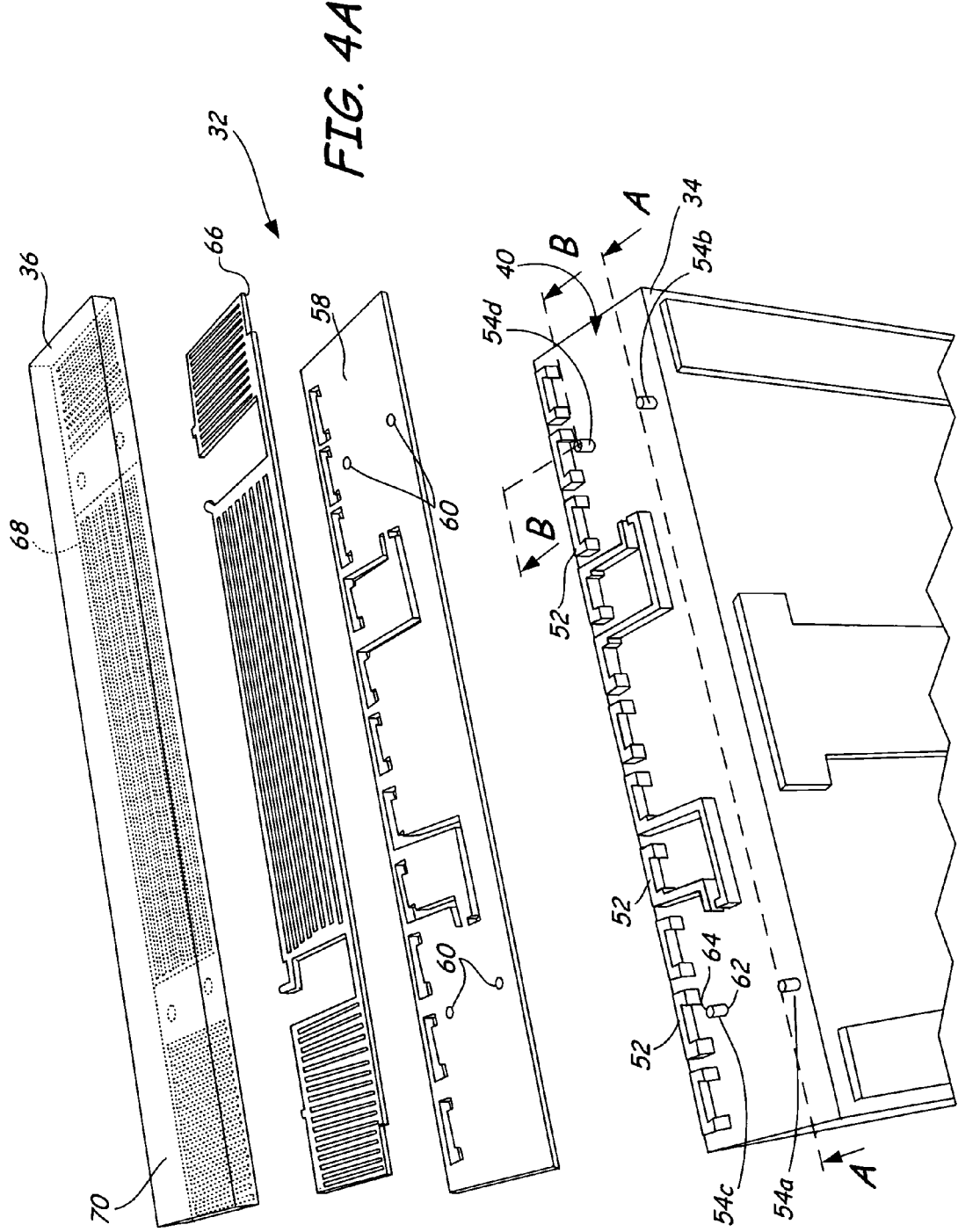

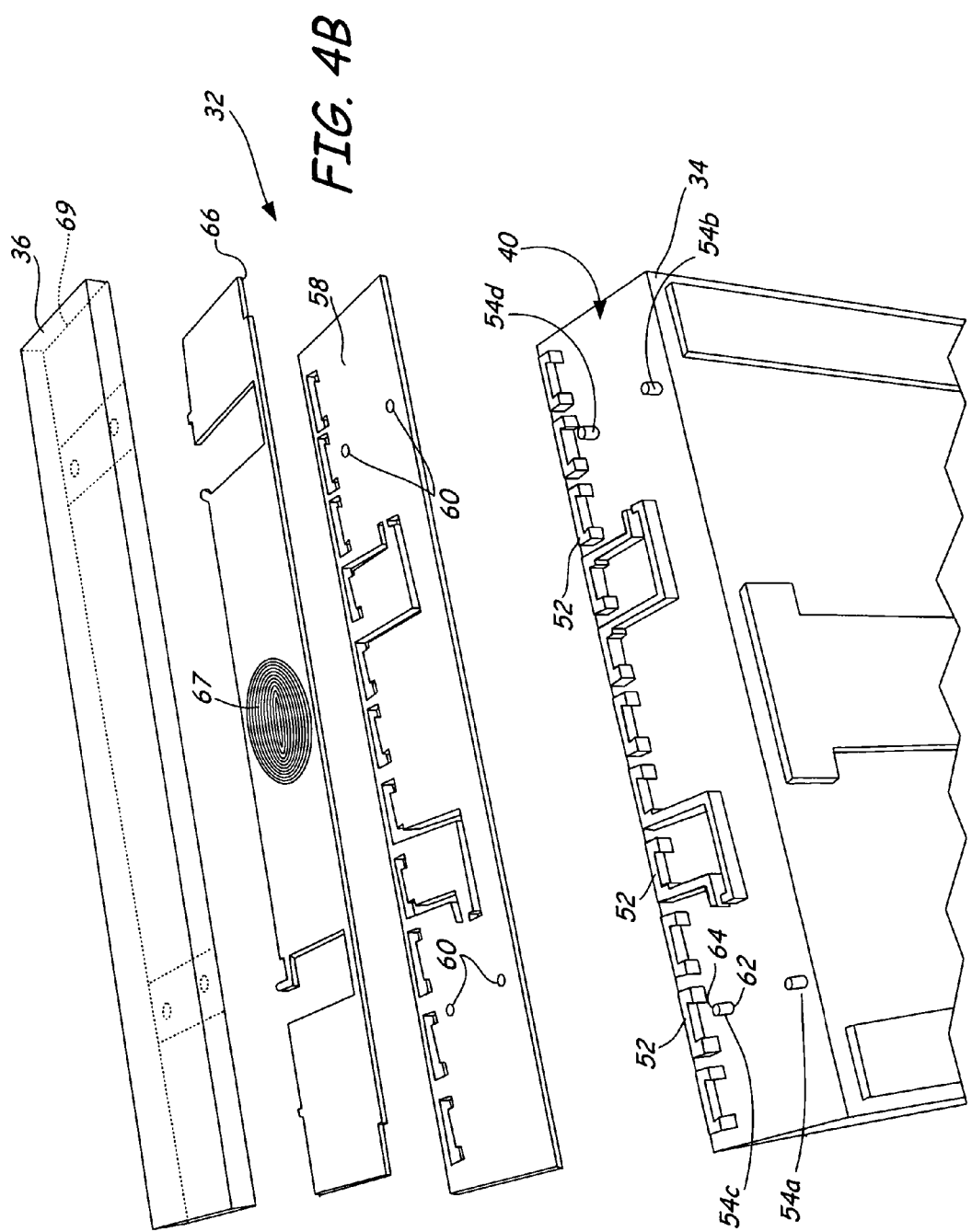

TRANSDUCER-LEVEL MICROACTUATOR FOR A MAGNETIC RECORDING SYSTEM

BACKGROUND OF THE INVENTION

The present invention relates to a disc drive microactuator, and more particularly to a high resolution positioning mechanism for selectively moving a transducer portion of the slider radially with respect to circumferential data tracks of a rotatable disc.

The density of concentric data tracks on magnetic discs continues to increase (that is, the size of data tracks and radial spacing between data tracks are decreasing), thereby requiring more precise radial positioning of the head. Conventionally, head positioning is accomplished by operating an actuator arm with a large-scale actuator motor, such as a voice coil motor, to position a head on a flexure at the end of the actuator arm. The large-scale motor lacks sufficient resolution and bandwidth to effectively accommodate high track-density discs. Thus, a high resolution head positioning mechanism is necessary to accommodate the more densely spaced tracks. Another challenge is that the track density of magnetic discs increases as the flying height of the transducer head above the surface of the disc must decrease for effective data writing and reading, without compromising the reliability of the head-to-disc interface due to wear. As the fly-height becomes lower, it becomes more critical to maintain the fly-height precisely at a desired value. A slight decrease may cause contact between the head and the disc, which could cause a catastrophic failure, and a slight increase during writing or reading could cause errors in transducing data with the disc.

One promising approach for high resolution head positioning involves employing a high resolution microactuator in addition to the conventional low resolution actuator motor, thereby effecting head positioning through dual-stage actuation. Various microactuator designs have been considered to accomplish high resolution head positioning. Various locations for the microactuator have been suggested, including, for example, on the slider, on the gimbal, at the interface between the gimbal and the slider, and on the actuator arm. However, the previous designs have had shortcomings that limited the effectiveness of the microactuator, such as substantial performance limitations or manufacturing complexities, which made the microactuator designs impractical. An effective microactuator design must provide high acceleration in positioning the head while also generating sufficiently large and accurate displacements to precisely move the head across several data tracks on the disc.

Transducer-level microactuators allow precise off-track positioning for high-TPI data storage and active fly-height control. Typically, transducer-level microactuators include a main slider body and a movable rotor containing the transducer. The rotor is connected to the slider body by spring flexures. An actuation method, such as electrostatic electrodes or electromagnetic coils, is used to provide offtrack and/or fly-height actuation (or rotor preload forces). Previously disclosed fabrication methods for transducer-level microactuators depend heavily on deep reactive ion etched (DRIE) and high aspect ratio spring flexures between the rotor and the slider body. In general, the slider body is comprised of silicon and the spring flexures are etched out of the slider body to form the high aspect ratio silicon spring flexures. However, use of a silicon substrate is not ideal because it is not a standard material, is less understood and is not as robust than the standard alumina titanium carbide ($Al_2O_3TiC$) slider. In addition, silicon slider bodies have an increased likelihood of chipping, cracking, breakage, and/or other damage when the slider body is in use or if the hard drive is dropped. There is a need in the art for a transducer-level microactuator that can be made from standard $Al_2O_3TiC$ or other carbon based substrate material, is more robust, less likely to break during use, and easy to fabricate.

BRIEF SUMMARY OF THE INVENTION

The present invention relates to a slider. The slider includes a slider body having a leading edge and a trailing edge, a transducer body spaced from the trailing edge of the slider body and including at least one transducer element, and a flexure body extending from the trailing edge of the slider body. The flexure body includes a first anchor point connected to the slider body and a second anchor point connected to the transducer body. A basecoat layer is deposited on the trailing edge of the slider body, the basecoat layer substantially surrounding the flexure body and separated from the flexure body by a first gap. A first actuation means is formed on the basecoat and a second actuation means is formed on the transducer body adjacent to the slider body.

BRIEF DESCRIPTION OF THE DRAWINGS

FIG. 4A is an exploded perspective view of the trailing edge portion of the slider assembly according to the present invention.

FIGS. 4B and 4C are exploded perspective views of a trailing edge portion of an alternate embodiment of the slider assembly.

DETAILED DESCRIPTION

Figure 1:
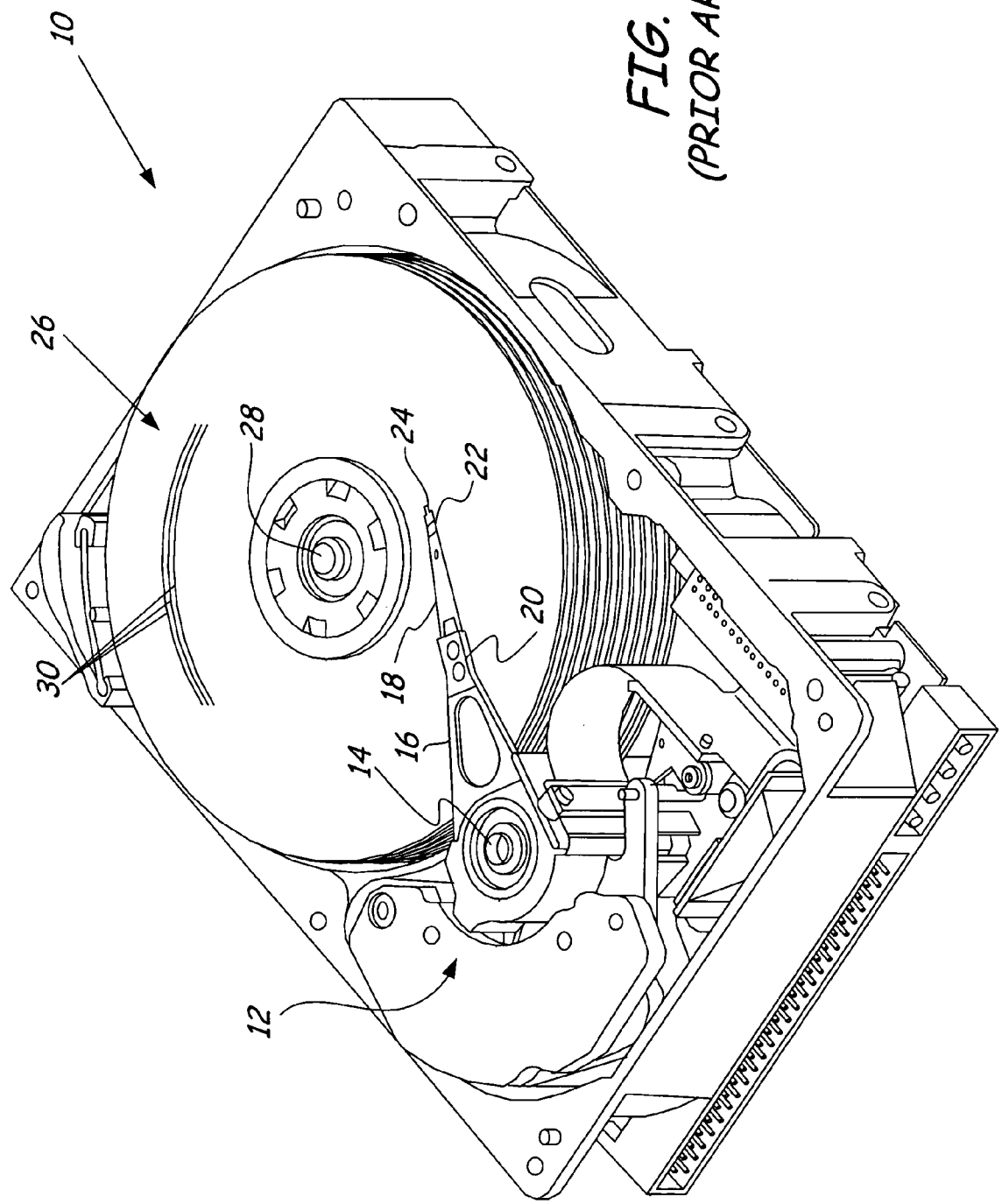
FIG. 1 is a perspective view of a prior art disc drive actuation system for positioning a slider over tracks of a disc.

FIG. 1 is a perspective view of a prior art disc drive actuation system 10. Actuation system 10 includes voice coil motor (VCM) 12 arranged to rotate an actuator arm 14 on a spindle around an axis 16. A head suspension 18 is connected to actuator arm 16 at a head mounting block 20. A flexure 22 is connected to an end of head suspension 18, and carries a slider 24. Slider 24 carries a transducing head (shown in FIG. 2) for reading and/or writing data on a disc 26, which rotates around an axis 28 and includes concentric tracks 30 on which the data is written. As disc 26 rotates, windage is encountered by slider 24 to keep it aloft a small distance above the surface of disc 26.

VCM 12 is selectively operated to move actuator arm 14 around axis 16, thereby moving slider 24 between tracks 30 of disc 26. However, for disc drive systems with high track density, VCM 12 lacks sufficient resolution and frequency response to position a transducing head on slider 24 precisely over a selected track of disc 26. Therefore, a higher resolution actuation device is necessary.

Figure 2:
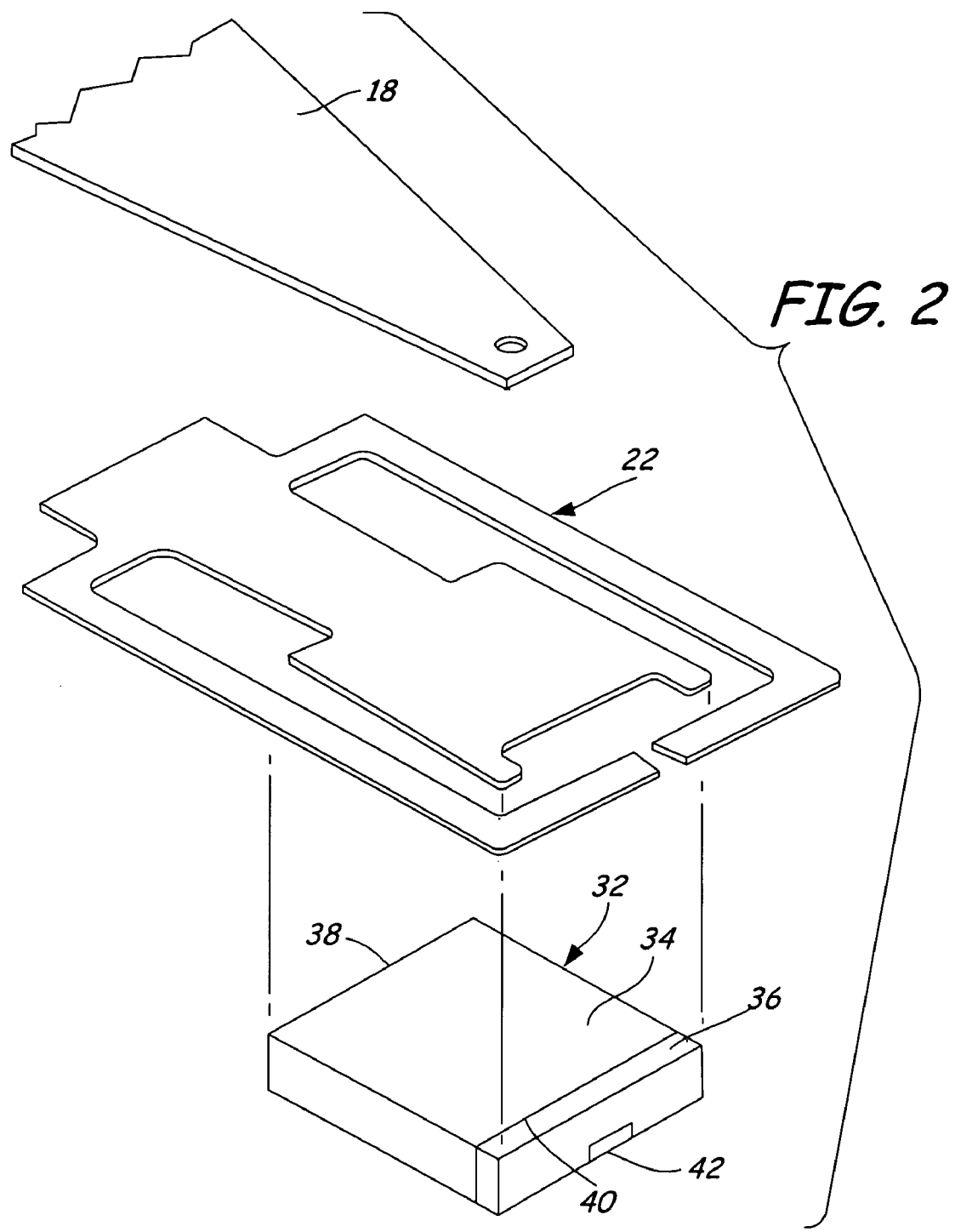
FIG. 2 is an exploded perspective view of a portion of a disc drive, including a slider assembly employing a microactuator according to the present invention.

FIG. 2 is an exploded perspective view of a portion of disc drive actuation system 10, including a slider assembly 32 according to the present invention. Flexure 22 is attached to head suspension 18, and slider assembly 32 is attached to flexure 22 so that slider 32 is carried above a surface of disc 26 (FIG. 1). Slider assembly 32 includes a slider body (or stator portion) 34 and a transducer body (or rotor portion) 36 movably attached to slider body 34. Slider body 34 has a leading edge 38 and a trailing edge 40, with transducer body 36 movably attached to slider body 34 at trailing edge 40. Transducing head 42 is carried by transducer body 36 of slider assembly 32 to transduce data with disc 26.

During operation of the disc drive, head suspension 18 and flexure 22 carrying slider assembly 32 are all moved together as coarse positioning is performed by VCM 12 (FIG. 1) to move actuator arm 14 (FIG. 1). To achieve fine positioning of transducing head 42, a microactuator (not shown in FIG. 2) employed by slider assembly 32 operates to displace transducer body 36, or a rotor portion of slider assembly 32, with respect to slider body 34, or a stator portion of slider assembly 32. As a result, transducing head 42 is displaced with high resolution for precise positioning over a selected track of disc 26.

Figure 3:
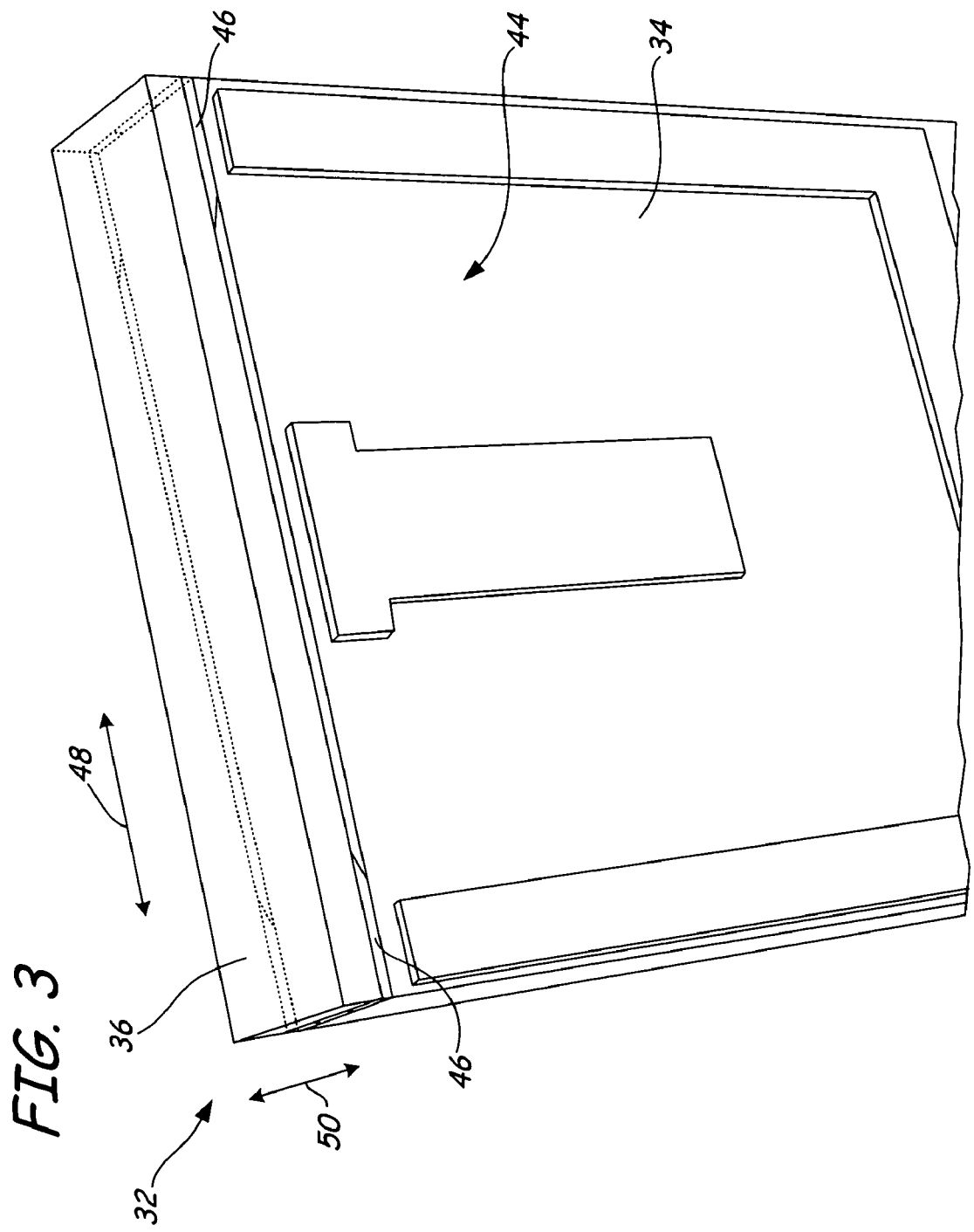
FIG. 3 is a bottom view of the slider assembly according to the present invention.

FIG. 3 is a bottom perspective view of slider assembly 32, including an air bearing surface 44, rotor portion 36 (for clarity, transducing head 42 is not shown), and stator portion 34. Flexure bodies 46 connect stator portion 34 to rotor portion 36 of slider assembly 32. A microactuator (including electrostatic electrodes shown in FIGS. 4A and 5) is actuated to move rotor portion 36 of slider assembly 32 with respect to stator portion 34. Rotor portion 36 moves parallel to disc 26, as shown by arrow 48, and perpendicular to disc 26, as shown by arrow 50. Displacing transducer body 36 of slider assembly 32 with respect to slider body 34 finely positions transducing head 38 with respect to disc 26, as well as controls fly-height of transducing head 42.

Figure 4C:
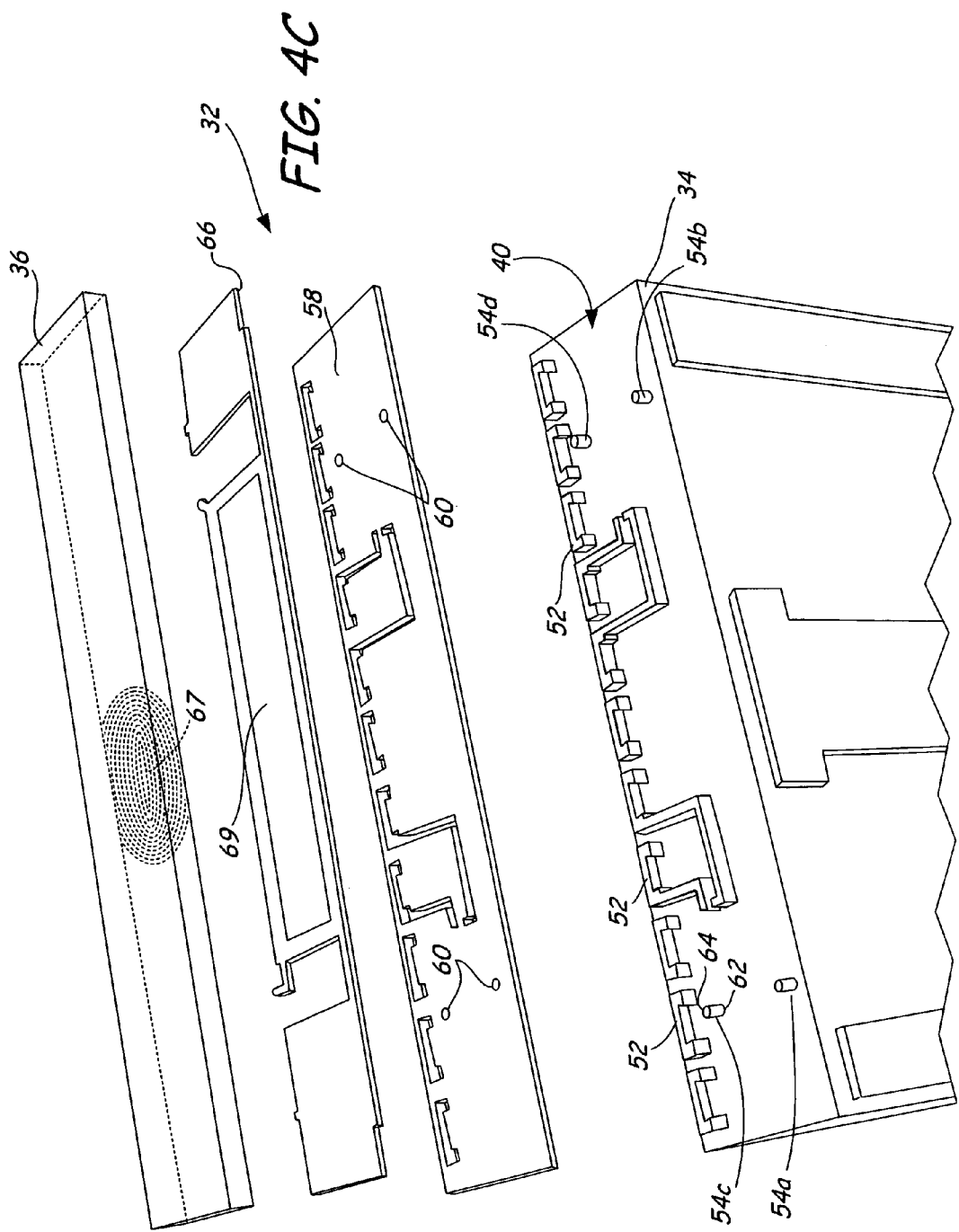
Figure 5:
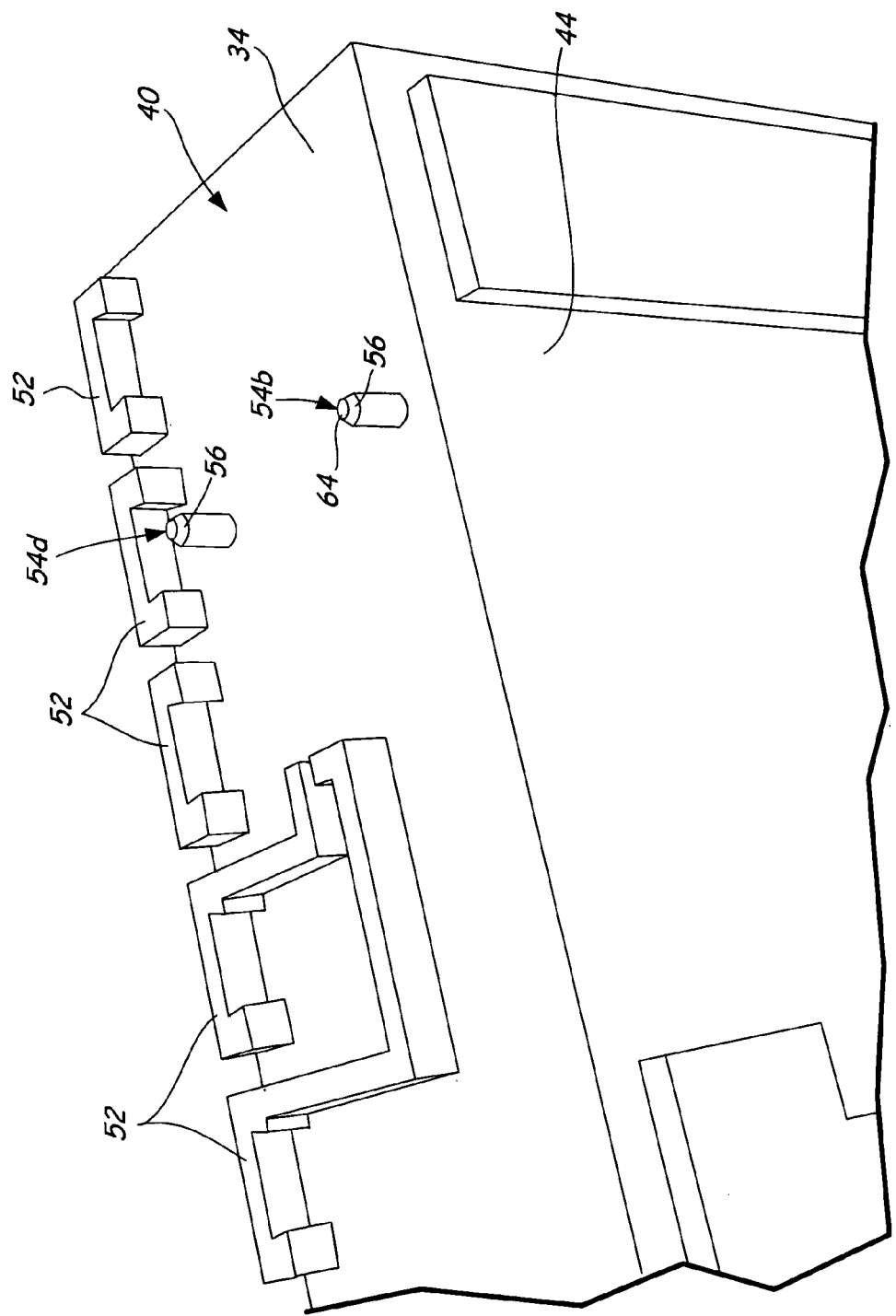
FIG. 5 is a perspective view of a portion of the trailing edge portion of the slider assembly according to the present invention.

FIG. 4A is an exploded perspective view of slider assembly 32 according to the present invention and FIG. 5 is a perspective view of trailing edge portion 40 of slider body 34. Slider body 34 includes flexure bodies 46 and bond pads 52 built upon trailing edge 40. Slider body 34 is a standard slider wafer comprised of alumina titanium carbide ($Al_2O_3TiC$), or the like. In the embodiment shown in FIG. 4, flexure bodies 46 includes four spring flexures 54a, 54b, 54c, and 54d that have a generally cylindrical shape and form flexible columns. Further embodiments may include fewer or more spring flexures. Spring flexures 54a-54d and bond pads 52 are formed on trailing edge 40 of slider body 34, for example, by plating. Spring flexures 54a-54d and bond pads 52 are made of a metal that is non-corrosive, and mechanically robust and strong. Spring flexures 54a-54d and bond pads 52 may be made of the same metal or different metals.

During fabrication of slider assembly 32 spring flexures 54a-54d are surrounded by a sacrificial side wall 56, which is later etched away after formation of transducer body 36. Slider assembly 32 also includes an insulating basecoat 58 deposited on trailing edge 40 of slider body 34 to surround sacrificial sidewall 56 of spring flexures 54a-54d and bond pads 52. Basecoat layer 58 includes openings 60 to provide a contact path to spring flexures 54a-54d. A first end 62, or first anchor point, of each spring flexure is connected to slider body 34. A second end 64, or second anchor point, of each spring flexure is connected to transducer body 36. After fabrication of transducer body 36, sacrificial side wall 56 is removed to form a gap between spring flexures 54a-54d and insulating basecoat 58, which thereby provides mechanical freedom for spring flexures 54a-54d to move and displace transducer body 36.

Stator electrodes 66 are formed upon basecoat layer 58 using a deposition process. Rotor portion 36 is connected to stator portion 34 by spring flexures 54a-54d. Rotor portion 36 of slider assembly 32 includes rotor electrodes 68, which are formed using a deposition process. For example, the fabrication method disclosed in U.S. patent application Ser. No. 10/286,652, entitled "Slider for a Data Storage Device including Transducer Level Micro-Positioning and Method of Fabrication Thereof" and assigned to Seagate Technology LLC, and hereby incorporated by reference, may be used to build the stator and rotor electrodes forming the microactuator. Rotor portion 36 further includes an insulating layer 70 deposited upon rotor electrodes 68. Rotor electrodes 68 interdigitate with stator electrodes 66. Stator electrodes 66 and rotor electrodes 68 form an electrostatic microactuator. Actuation of the microactuator moves rotor portion 36 with respect to stator portion 34 to position transducing head 42 (FIG. 2) with respect to disc 26 (FIG. 1) and control fly-height of transducing head 42.

Although not shown in FIGS. 4A and 5, electrical connections are made from bond pads 52 to transducing head 42. Electrical connections from bond pads 52 are made through vias conductively connected to stator electrodes 66. Flying leads formed in rotor electrodes 68 electrically connect stator electrodes 66 to the rotor electrodes. Compliant metal beams that are mechanically separated from stator 34 and rotor 36, except at anchor points, provide electrical connections to rotor electrodes 68 and transducing head 42.

FIGS. 4B and 4C are exploded perspective views of trailing edge 40 of an alternate embodiment of slider assembly 32. Slider assembly 32 includes an electromagnetic microactuator. FIG. 4B shows an electromagnetic microactuator with a deposited coil structure 67 on stator portion 34 and a permanent magnet film 69 on rotor portion 36 and FIG. 4C shows an electromagnetic microactuator with deposited coil structure 67 on rotor portion 36 and permanent magnet film 69 on stator portion 34.

Figure 10:
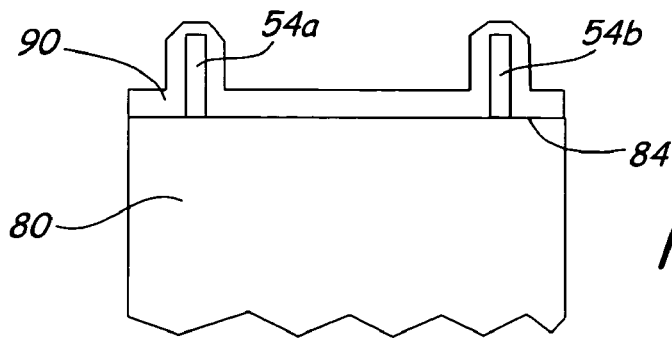
Figure 11:
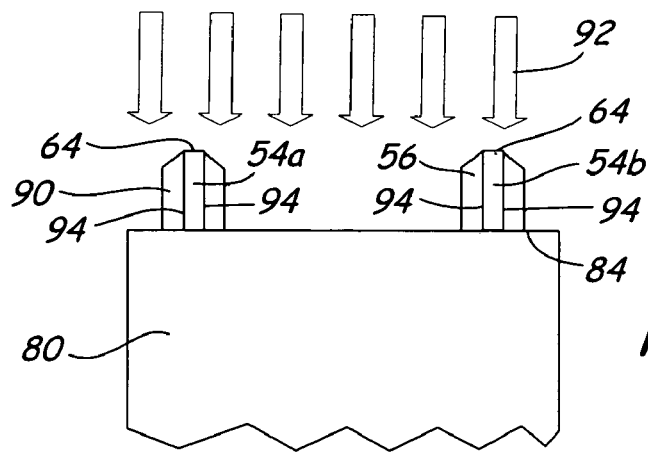
Figure 12:
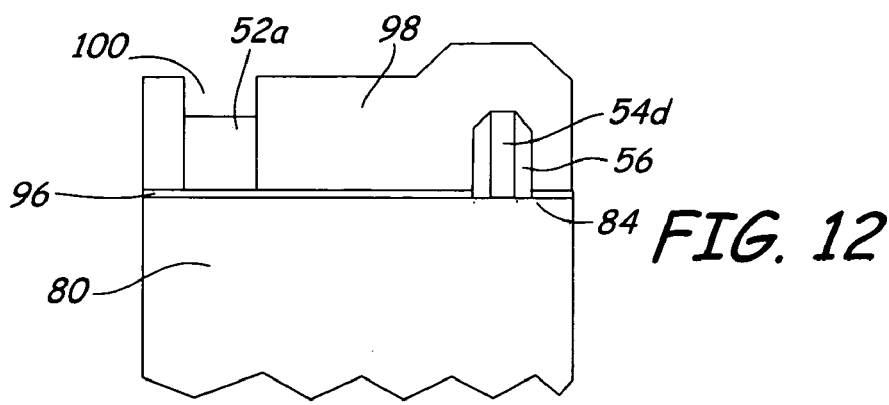
Figure 13:
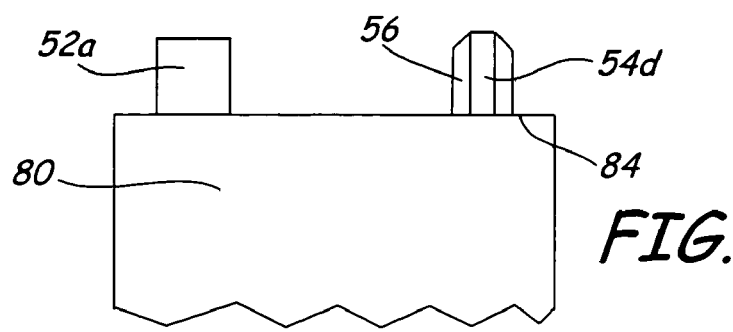

FIGS. 6-17 are diagrams illustrating a process flow for fabricating slider assembly 32, and in particular a transducer-level microactuator, of an exemplary embodiment of the slider assembly shown in FIGS. 4A and 5. FIGS. 6-11 and 14-17 are illustrative of a cross-sectional view of FIG. 4A along line A-A, while FIGS. 12 and 13 are illustrative of cross-sectional view of the slider assembly of FIG. 4A taken along line B-B. The diagrams shown in FIGS. 6-17 are simplified so that the general process flow for forming slider assembly 32 is clearly illustrated, therefore, some features of slider assembly 32 are not shown to more clearly illustrate the present invention. As the process flow is described, differences from the embodiment shown in FIGS. 4 A and 5 are specifically explained. Although the diagrams of FIGS. 6-17 illustrate the formation of a single slider assembly, it will be understood by those skilled in the art that fabrication will preferably occur at the wafer-level, before singulation of individual slider assemblies, for improved efficiency.

Figure 6:
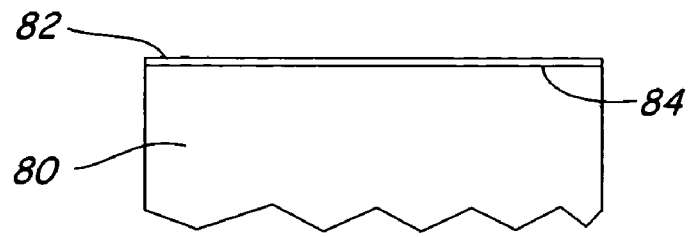
FIGS. 6-17 are diagrams illustrating a process for fabricating the slider assembly according to the embodiment shown in FIGS. 4A and 5.

As shown in FIG. 6, a slider wafer 80 forms a base of slider body 34. A seedlayer 82 is deposited on a top surface 84 of slider wafer 80. Slider wafer 80 is composed of a standard wafer material, such as $Al_2O_3TiC$ or the like, however, in further embodiments the wafer may be composed of other materials, which permit building of flexure body 46 with an additive plating method utilizing a sacrificial gap layer. Seedlayer 82 is generally a metal that is non-corrosive, mechanically robust, and strong. In further embodiments of the present invention, additional adhesion materials or steps are used to promote adhesion between slider body 34 and spring flexures 54a-54d. For example, an adhesion layer is deposited upon top surface 84 and seedlayer 82 is deposited on top of the adhesion layer. In another example, a two grain material is deposited on top surface 84 and a material selective etch is done to create a rough-porous adhesive interface between slider body 34 and spring flexures 54a-54d.

Figure 7:
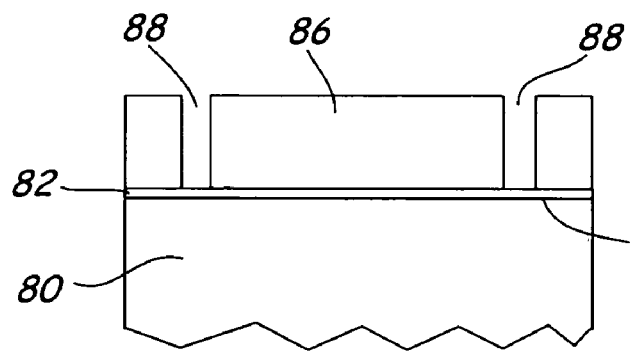

In FIG. 7, a plating mold 86 for spring flexures 54a-54d is patterned on seedlayer 82. Generally, plating mold 86 is composed of a photoresist. Plating mold 84 defines cavities 88 having the shape characteristics of spring flexures 54a-54d. Plating mold 86 may also be patterned for bond pads 52 if the spring flexures and the bond pads are to be plated from the same metallic seedlayer. However, in the fabrication process shown in FIGS. 6-17, bond pads 52 are plated from a different material than spring flexures 54a-54d and at a different part of the process (as shown in FIGS. 12 and 13). At this point in the fabrication, if the bond pads and the spring flexures are to be composed of the same material, plating mold 86 includes cavities defining the shape characteristics of bond pads 52.

Figure 8:
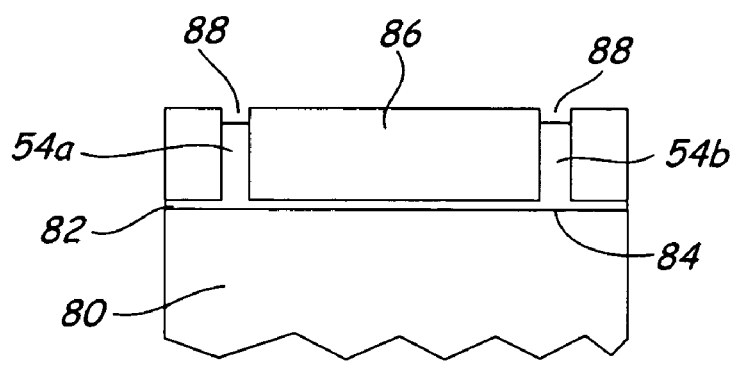

In FIG. 8, seedlayer 82 is electroplated up within cavities 88 of plating mold 86 to form the high aspect ratio spring flexures 54a and 54b. Spring flexures 54a and 54b, as shown in FIGS. 4A and 5 and described in this fabrication process, have a cylindrical shape to form a flexible column.

Figure 9:
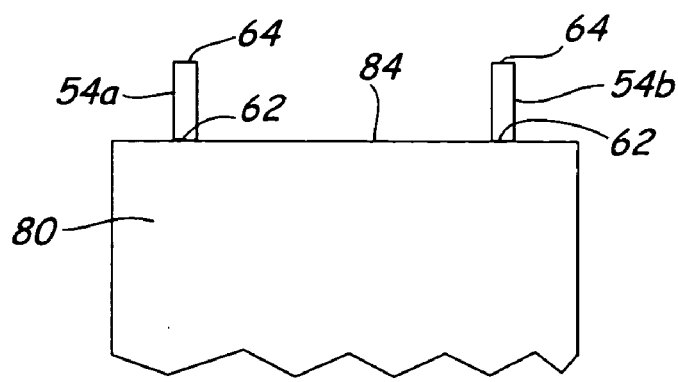

In FIG. 9, plating mold 86 is removed from slider wafer 80 and seedlayer 82 and seedlayer 82 is removed from top surface 84 of slider wafer 80. Plating mold 86 is chemically stripped off slider wafer 80 and the remaining thin metal seedlayer 82 is ion milled, blasted off, or etched off top surface 84 of slider wafer 80. After removing plating mold 86 and seedlayer 82, the diameter of spring flexures 54a and 54b may be optionally reduced, for example by either reactive ion etching (RIE), an ion mill, or a wet etch.

Spring flexures 54a-54d of the present embodiment are thick, tall, vertical columns. The columns are flexible in a direction parallel to the disc surface and in a direction perpendicular to the disc surface to provide movement of transducer body 36 to position the transducing head 42 and adjust the fly-height of transducing head 42. Spring flexures 54a-54d are stiff along the longitudinal axis of the column. First end 62 of each spring flexure is connected to slider wafer 80.

In FIG. 10, a sacrificial material 90 is deposited upon slider wafer 80 to completely surround and conform to spring flexures 54a-54d. One method of depositing sacrificial material 90 is by sputter deposition, such as PECVD. Sacrificial material 90 has a thickness of about 2 microns. Examples of sacrificial material 90 include silicon, silicon dioxide, germanium (or a germanium rich silicon germanium), or the like. As can be seen in FIG. 10, sacrificial material 90 is deposited at an angle around second end 64 of each spring flexure. Later in the fabrication process, sacrificial material 90 is removed to form a spacing, or gap, between spring flexures 54a-54d and the adjacent basecoat 58. Such a spacing allows movement of spring flexures 54a-54d to position rotor portion 36 of slider assembly 32.

In FIG. 11, sacrificial material 90 deposited on the horizontal surfaces of slider wafer 80 and spring flexures 54a and 54b (i.e., the top surface 84 and second ends 64) are removed, for example by a directional ion mill perpendicular to wafer surface 84. Arrows 92 illustrate the directional movement of the ion mill. The ion mill does not remove the sacrificial material from the vertical surfaces of the spring flexures. Thus, the only remaining sacrificial material 90 is located on sides 94, or vertical surfaces, of spring flexures 54a and 54b. Sacrificial material 90 conforms to sides 94 of spring flexures 54a and 54b and forms sacrificial side wall 56, or a sheath of sacrificial material 90, around the springs. Second ends 64, or top surfaces, of each spring flexure is exposed to provide a connection with rotor portion 36 of slider assembly 32.

FIGS. 12 and 13 are diagrams illustrating the fabrication of bond pad 52a, and in particular, bond pads composed of a material different than the spring flexures. Bond pads 52 composed from the same material as spring flexures 54a-54d would be plated at the same time as the spring flexures. For example, the plating mold pattern for the spring flexures would also define a mold for the bond pads.

In FIG. 12, a seedlayer 96 is deposited on wafer surface 84 and a plating mold 98 is deposited thereon. Plating mold 98 includes cavity 100 that defines the shape characteristics of bond pad 52a. Seedlayer 96 is composed of a metal and plating mold 98 is composed of a photoresist. Seedlayer 96 is electroplated up within cavity 100 of plating mold 98 to form bond pads 52. In FIG. 13, bond pad plating mold 98 is removed from wafer surface 84, for example, by stripping off the plating mold, and the remaining seedlayer material 96 is removed away from wafer surface 84, for example, by milling or etching the seedlayer off slider wafer 80.

In an alternate embodiment of the present invention, a sacrificial layer is deposited around bond pads 52 to protect the bond pads during singulation, or dicing, of slider wafer 80 to form individual slider assemblies 32. During dicing, a cut is made around the sacrificial protective layer, which is etched away to expose bond pads 52. Thus, the hard $Al_2O_3TiC$ wafer 80 and metal bond pads 52 are not cut at the same time. Alternatively, the sacrificial protective layer for the bond pads 52 is partially etched to expose the bond pads, but not the flexure body.

Figure 14:
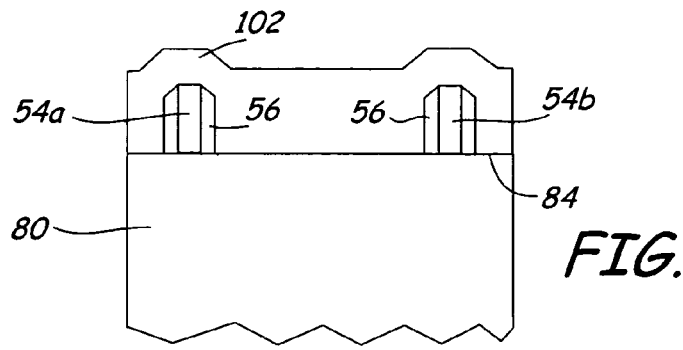

In FIG. 14, a basecoat material 102 is deposited on wafer surface 84, including rough parts, to surround sacrificial side walls 56 of spring flexures 54a and 54b and bond pads 52 (not shown). Basecoat 102 overfills the height of spring flexures 54a and 54b to fill in slider wafer 80. Basecoat 102 is composed of alumina, or the like.

Figure 15:
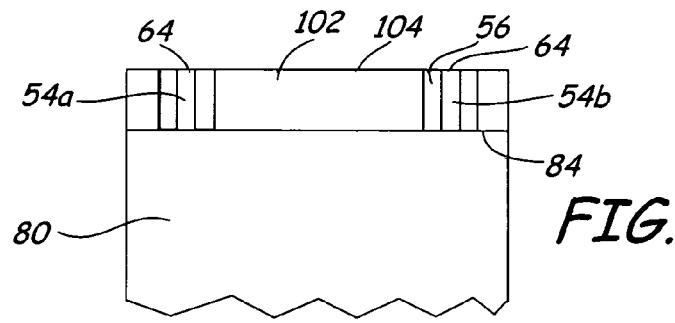

In FIG. 15, basecoat 102 is planarized to form a smooth surface 104 for building microactuator electrodes and transducer body 36 on top of basecoat 102. Planarized surface 104 results in a smooth wafer topography to build stator electrodes 66 and transducer body 36. Basecoat 36 is planarized down to top surfaces 64 of spring flexures 54a-54d and bond pads 52. The exposed top surfaces 64 of spring flexures 54a-54d and bond pads 52 provide a connection point to transducer body 36 or electrical interconnects. In further embodiments of the present invention, additional adhesion materials or processes are used to promote adhesion between spring flexures 54a-54d with rotor portion 36. Spring flexures 54a-54d have a diameter of about 5 microns and a height in the range of about 5 microns to about 55 microns, in the present embodiment most preferably about 50 microns.

Figure 16:
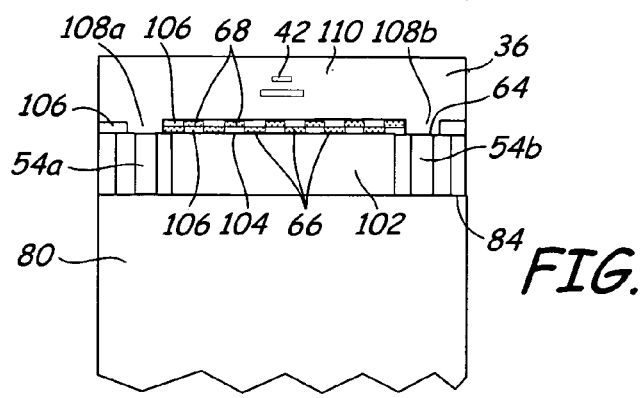

FIG. 16 illustrates stator electrodes 66, rotor electrodes 68, and transducer body 36 of slider assembly 32 built upon planarized wafer surface 104. A standard slider build process, including rotor air bearing and top bond pad exposure is used. For example, a method of fabricating the microactuator (i.e., stator and rotor electrodes 66 and 68) and rotor portion 36 is disclosed in U.S. patent application Ser. No. 10/286,652, although other fabrication methods typically known in the art may be used. Stator electrodes 66 are patterned upon planarized surface 104. A sacrificial layer 106, of the same material as sacrificial side wall 56 and, preferably silicon, is deposited upon stator electrodes 66 and basecoat 102. Rotor electrodes 68 are deposited upon sacrificial layer 106. Vias 108a and 108b are etched through sacrificial layer 106 to top surfaces 64 of spring flexures 54a and 54b to provide an interconnect between the spring flexures and transducer body 36. Although not shown in FIG. 16, electrical studs are deposited from flying leads to provide an electrical connection to transducing head 42. A second basecoat layer 110 is deposited upon sacrificial layer 106 and rotor electrodes 68 to form transducer body 36. Basecoat layer 110 is planarized. Transducing head 42 is fabricated in transducer body 36 through a standard wafer build process and additional material is deposited to form transducer body 36.

Figure 17:
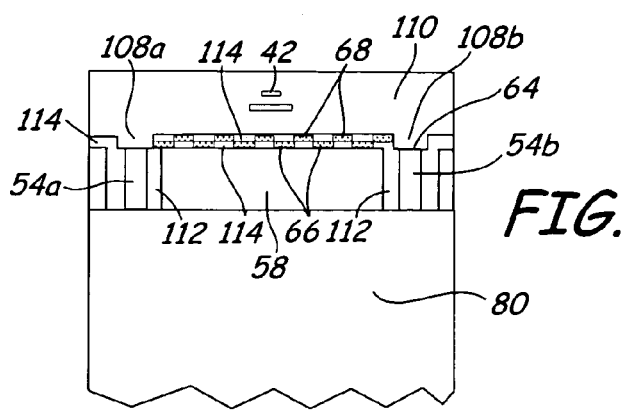

In FIG. 17, sacrificial material 90 and sacrificial layer 106 are removed from slider assembly 32, for example by etching. The type of etch used depends on the sacrificial material. Silicon as the sacrificial material uses a $XeF_2$ gas etch, silicon dioxide uses a HF vapor or liquid etch, and germanium (or Ge-rich SiGe) uses an $H_2O_2$ etch. Removing sacrificial material 90 and sacrificial layer 106 forms spacings within slider assembly 32 and exposes bond pads 52. Gap 112 between basecoat 58 and spring flexures 54a and 54b provide mechanical freedom for movement of the spring flexures. Gap 114, resulting from removal of sacrificial layer 106, creates the interdigitation of stator and rotor electrodes 66 and 68. Slider wafer 80 is then singulated into individual slider assemblies 32.

Figure 18:
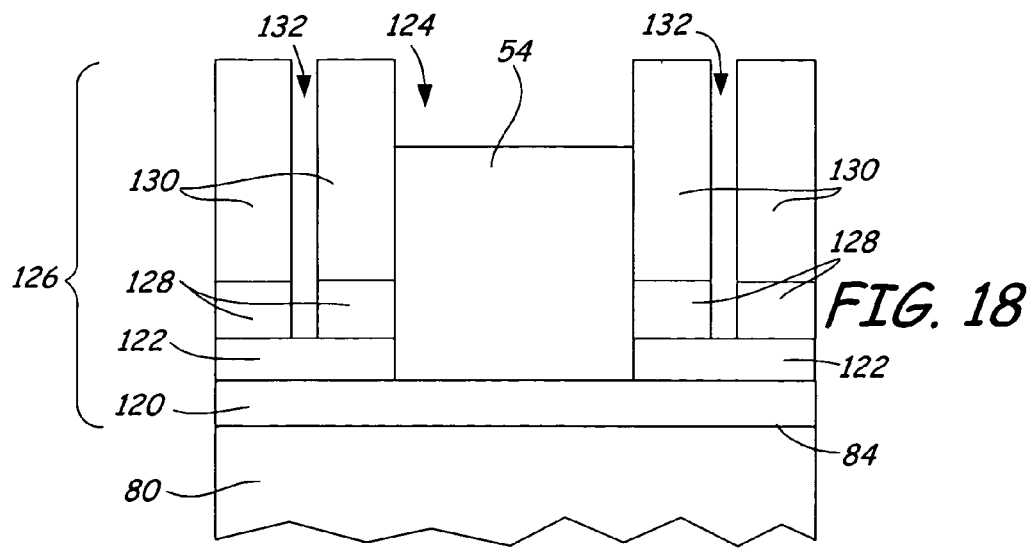
FIG. 18 is a diagram illustrating an alternate process for fabricating the slider assembly according to the embodiment of the present invention shown in FIGS. 4A and 5.

FIG. 18 is a diagram illustrating an alternate fabrication process flow for building spring flexures 54a-54d of the embodiment shown in FIGS. 4A and 5. A seedlayer 120 is deposited on top surface 84 of slider wafer 80 and an insulating film 122 is deposited on top of seedlayer 120. Insulating film 122 is patterned to form cavity 124 to seedlayer 120 and provide a plating mold 126 for spring flexure 54. A sacrificial layer 128 is deposited upon insulating layer 122 and is patterned to define cavity 124 to seedlayer 120 and further form plating mold 126. A photo-imagable epoxy 130, such as SU-8, is deposited on sacrificial layer 128, for example by spinning. Photo-imagable epoxy 130 is patterned to further define cavity 124 to seedlayer 120 and form plating mold 126. In addition, etch vias 132 are patterned in epoxy 130 to form an opening to insulating layer 122. Epoxy 130 is cured after it is patterned.

Slider wafer 80 is electroplated such that seedlayer 120 is plated and grows within cavity 124 to form spring flexure 54 within plating mold 126. Epoxy 130 is removed by dissolving sacrificial layer 128. Dissolvent is applied to sacrificial layer 128 through etch vias 132. Once plating mold 126 is removed, insulating layer 122 and seedlayer 120 are etched away, with slider wafer 80 and spring flexure 54 remaining.

The method described with respect to FIG. 18 is used for fabricating high aspect ratio spring flexures, preferably having a height in the range of about 35 microns to about 55 microns. The method permits use and removal of the epoxy plating mold 126 without harming metallic seedlayer 120, and epoxy 130 provides a low cost process for obtaining a high aspect ratio mold 126. SU-8 is a spin on epoxy material that can be photo-patterned with very high aspect ratios, however, SU-8 cannot be removed using conventional means. Thus, insulating layer 122 and sacrificial layer 128 are used to remove the SU-8 without harming the metal seedlayer 120 on slider wafer 80. Insulating layer 122 allows use of conductive sacrificial layers without plugging etch vias 132 with the plated seedlayer. Finally, etch vias 132 provide fast removal of sacrificial layer 128 that lifts off epoxy 130.

Figure 19:
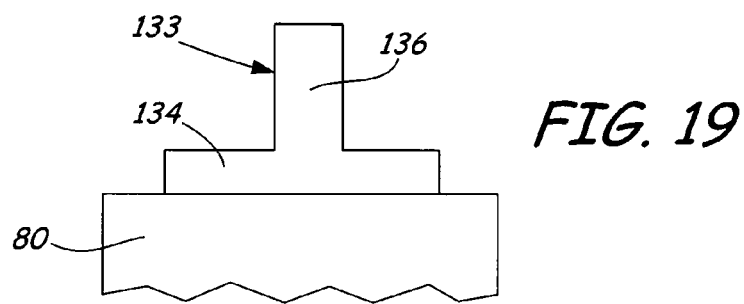
FIGS. 19-21 are diagrams illustrating a process for fabricating spring flexures of the slider assembly according to the embodiments of the present invention shown in FIGS. 4A and 5.

FIG. 19 is a diagram of an alternative embodiment of a flexure body 133. Flexure body 133 is a cylindrical column structure, including a base portion 134 and a body 136. Base portion 134 has a wider diameter than body 136 to provide an increased area of attachment and a wide anchor point for better adhesion to slider wafer 80. In alternate embodiments of flexure body 133 having a wide anchor point, flexure body 133 has different shapes or are lateral (e.g., discussed below with respect to FIGS. 22-43).

Two different methods may be utilized to build the spring flexure shown in FIG. 19, a two-resist method and an e-beam cure method. The two-resist method uses two types of resist with different dissolution rates to form a plating mold for flexure body 133. The e-beam cure method uses controlled e-beam curing to cure a top part of a plating mold, but not a bottom part of the plating mold, to create a difference in resist dissolution to allow for an undercut that results in a T-shaped mold.

Figure 20:
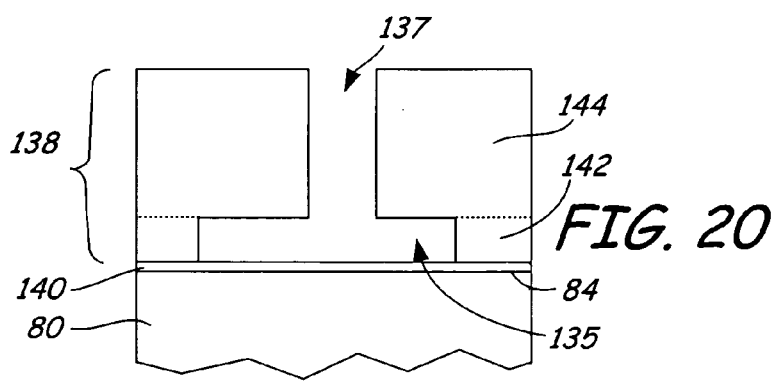

In FIG. 20, a spring flexure plating mold 138 is formed on slider wafer 80. A seedlayer 140 is deposited on top surface 84 of slider wafer 80. In the two-resist method, a first resist layer 142 is deposited upon seedlayer 138 and is patterned to form a cavity 135 of plating mold 138 defining base portion 134 of flexure body 133. A second resist 144 is deposited upon first resist layer 142 and is patterned to form a cavity 137 of plating mold 138 defining body 136 of flexure body 133. First resist 142 has a faster dissolution rate than second resist 144. In the e-beam curing method, a single resist layer is deposited on the slider wafer. Controlled e-beam curing cures top layer 144 of the resist layer, but does not cure bottom layer 142 of the resist layer, thereby resulting in a difference in resist dissolution between top layer 144 and bottom layer 142 of the resist layer wherein bottom layer 142 has a faster dissolution rate than top layer 144.

In both methods, the resist layers are etched and chemically dissolved to pattern plating mold 138. Because bottom layer 142, or the first resist, has a faster dissolution rate than top layer 144, or the second resist, bottom layer 142 dissolves away faster than top layer 144. Bottom layer 142 is dissolved away to form the wider base cavity 135 of plating mold 138 and top layer 144 is dissolved away at a slower rate than bottom layer 142 to form body cavity 137 of plating mold 138.

Figure 21:
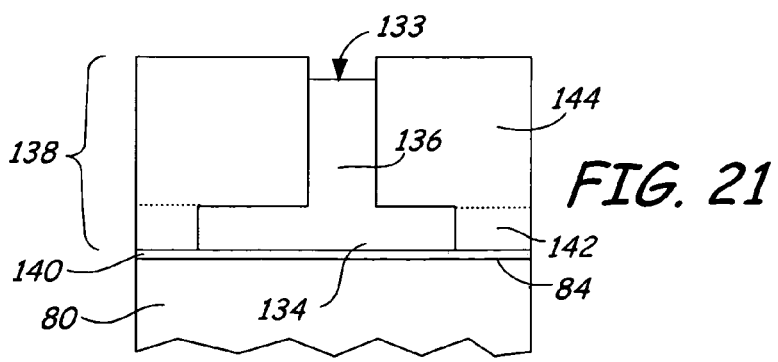

In FIG. 21, slider wafer 80 and seedlayer 140 are electroplated to build up flexure body 133 within plating mold 138. Resist 142 and 144 are stripped away and remaining seedlayer 140 is etched away, resulting in flexure body 133 shown in FIG. 19.

Figure 22:
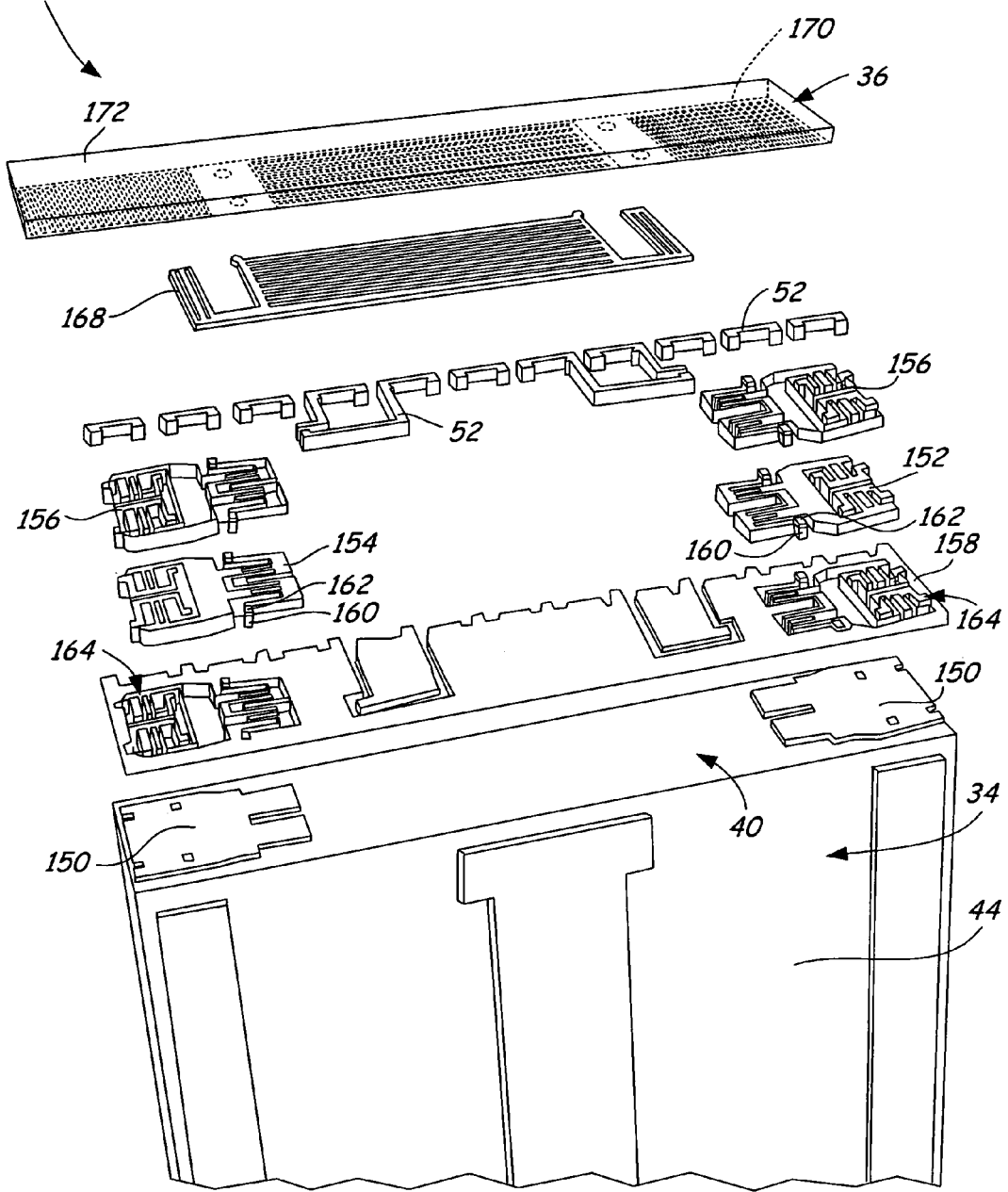
FIG. 22 is a exploded perspective view of a trailing edge portion of a slider assembly according to a further embodiment of the present invention.
Figure 23:
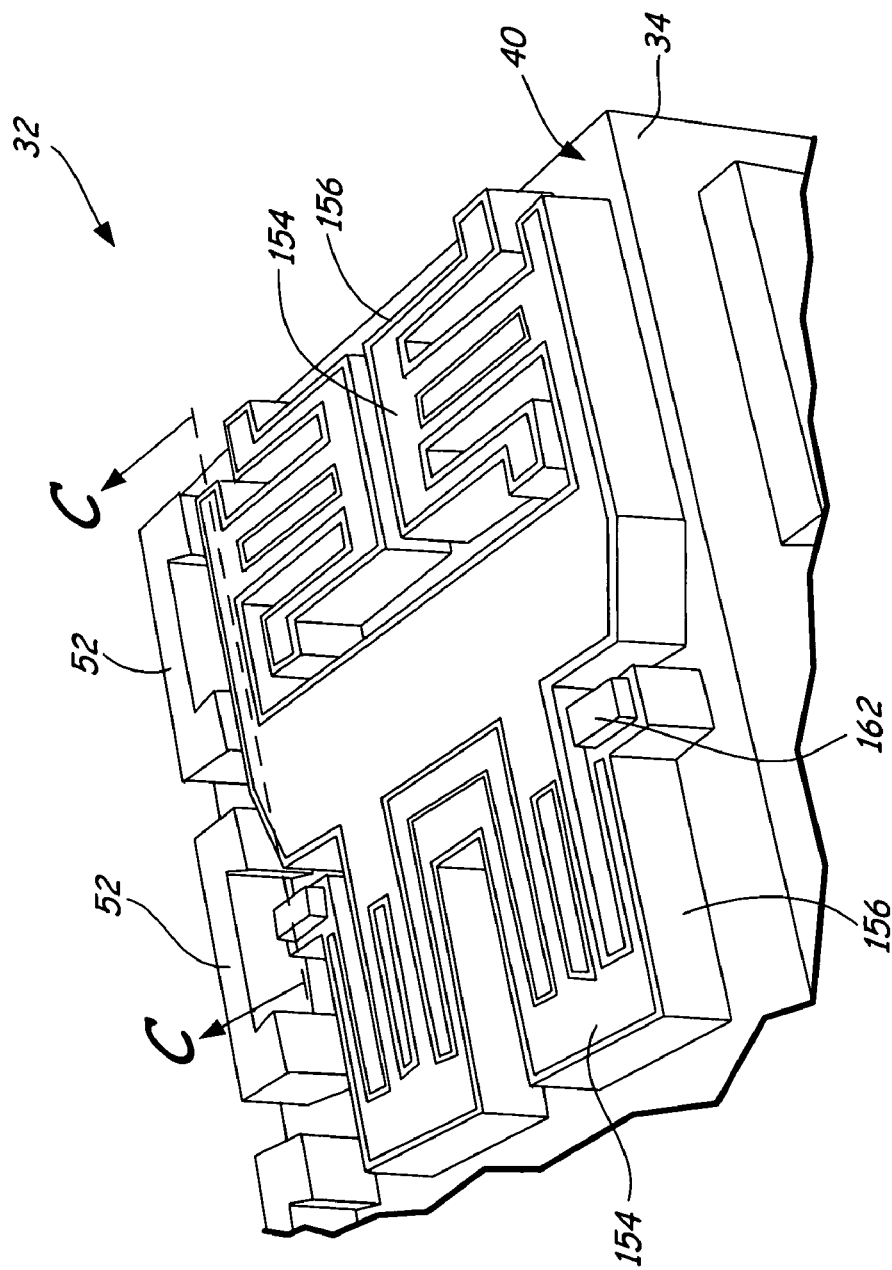
FIG. 23 is a perspective view of a portion of the trailing edge portion of the slider body of the slider assembly of FIG. 22.

FIGS. 22 and 23 are perspective views of a further embodiment of slider assembly 32 according to the present invention. FIG. 22 is an exploded perspective view of slider assembly 32 and FIG. 23 is a perspective view of trailing edge 40 of slider body 34. Transducing head 42 is not shown in FIG. 22 for clarity. Slider body 34 a standard slider wafer composed of Al$_2$O$_3$TiC or the like. A first sacrificial layer 150, flexure bodies 152 and 154, bondpads 52, sacrificial sidewall 156 and basecoat 158 are formed upon trailing edge 40 of slider body 34. In the embodiment shown in FIG. 22, flexure bodies 152 and 154 are lateral beam springs, or cantilever beams, each having a first anchor point 160 connected to slider body 34 and a second anchor point 162 for connection to transducer body 36. Flexure bodies 152 and 154 include a number of cantilever beams having varying shapes. Further embodiments of the flexure bodies may have differing shapes, or fewer or more cantilever beams. However, all embodiments of the flexure bodies will have at least one first anchor point 160 connected to slider body 34 and at least one second anchor point 162 connected to transducer body 36.

Flexure bodies 152, 154 and bond pads 52 are formed along trailing edge 40 of slider body 34, for example by plating. Flexure bodies 152, 154 and bond pads 52 are made of a metal that is not corrosive, and mechanically robust and strong. Flexure bodies 152, 154 and bond pads 52 may be made of the same metal or different metals. In alternate embodiments of the present invention, slider bond pads 52 form connections to larger bond pads formed on a face opposite air bearing surface 44.

Flexure bodies 152, 154 are built upon sacrificial layer 150, which is deposited upon trailing edge 40 of slider body 34. Flexure bodies 152 and 154 are surrounded by sacrificial sidewall 156. Each flexure body is encased by sacrificial sidewall 156, which substantially surrounds all sides of the flexure body except for first anchor point 160 connecting the flexure body to slider body 34 and second anchor point 162 for connecting the flexure body transducer body 36. After fabrication of transducer body 36, sacrificial sidewall 156 and sacrificial layer 150 are removed to form a gap between flexure bodies 152, 154 and basecoat 158, and flexure bodies 152, 154 and slider body 34, respectively. The gaps provide mechanical freedom of the flexure bodies to move and displace transducer body 36. Insulating basecoat 158 is deposited on trailing edge 40 of slider body 34 and surrounds sacrificial sidewall 156 of flexure bodies 152 and 154 and bond pads 52. Basecoat layer 158 includes openings 164 to provide a contact path to flexure bodies 152, 154.

Stator electrodes 168 are formed upon basecoat layer 158 using a deposition process, as discussed above with respect to FIGS. 4A and 5. Rotor portion 36 is built using the same fabrication process discussed above with respect to FIGS. 4A and 5. Rotor portion 36 of slider assembly 32 includes rotor electrodes 170, which are built using a deposition process. Rotor electrodes 170 interdigitate with stator electrodes 168. Stator and rotor electrodes 168 and 170 form an electrostatic microactuator. Rotor portion 36 further includes an insulating layer 172 deposited upon rotor electrodes 170.

FIGS. 24-36 are diagrams illustrating a process flow for fabricating slider assembly 32 of the embodiment shown in FIGS. 22 and 23. FIGS. 24-36 illustrate a cross-sectional view taken along line C—C of FIG. 23. The diagrams shown in FIGS. 24-36 are simplified such that the general process flow for forming slider assembly 32 is clearly illustrated, therefore, some features of slider assembly 32 are not shown in order to more clearly illustrate the present invention. As the process flow is described, differences from the embodiment shown in FIGS. 22 and 23 are specifically explained. Although the diagrams of FIGS. 24-36 illustrate the formation of a single slider assembly, it will be understood by those skilled in the art that fabrication will preferably occur at the wafer-level, before singulation of individual slider assemblies, for improved efficiency.

Figure 24:
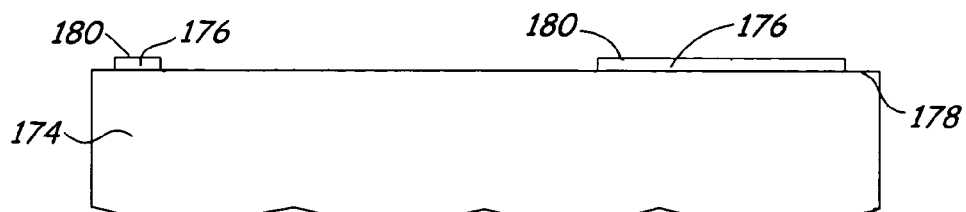
FIGS. 24-36 are diagrams illustrating a process for fabricating the slider assembly according to the embodiment shown in FIGS. 22 and 23.

As shown in FIG. 24, a slider wafer 174 forms a base of slider body 34. A first sacrificial layer 176 is deposited on a top surface 178 of slider wafer 174. Slider wafer 174 is composed of a standard wafer material, such as Al$_2$O$_3$TiC, or the like, however, further embodiments of the wafer may be composed of other materials, which permit building of flexure bodies 152 and 154 with an additive plating method utilizing a sacrificial gap layer. Sacrificial layer 176 is composed of silicon, or the like, however, further embodiments of the slider assembly may include a first sacrificial layer composed of silicon dioxide or germanium (or a Ge-rich SiGe). Sacrificial layer 176 is patterned to form a surface 180 upon which flexure bodies 152 and 154 are built.

Figure 25:
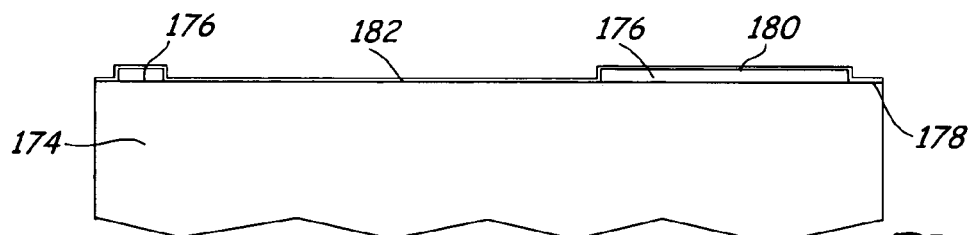

In FIG. 25, a seedlayer 182 is deposited upon top surface 178 of slider wafer 174, as well as sacrificial layer 176. In further embodiments of the present invention, additional adhesion materials or steps are used to promote adhesion between slider body 34 and flexure bodies 152 and 154. For example, an adhesion layer is deposited upon top surface 178 and seedlayer 182 is deposited on top of the adhesion layer. In another example, a two grain material is deposited on top surface 178 and a material selective etch is done to create a rough-porous adhesive interface between slider body 34 and the flexure bodies.

Figure 26:
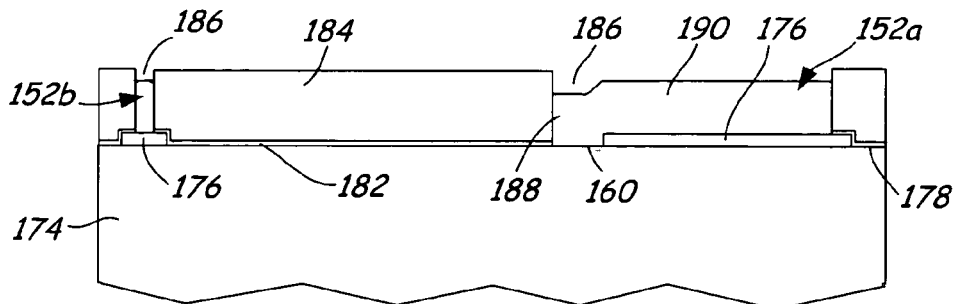

In FIG. 26, a plating mold 184 for flexure bodies 152, 154 is patterned on seedlayer 182. Generally, plating mold 184 is composed of a photoresist. Plating mold 184 includes cavities 186 that define the shape characteristics of beam structures 152a and 152b of flexure body 152. Plating mold 184 may also be patterned to define a mold for bond pads 52 if flexure bodies 152, 154 and bond pads 52 are to be plated from the same material. If flexure bodies 152, 154 and bond pads 52 are to be formed from a different material, bond pads 52 are formed at a different part of the fabrication process with a different material, as discussed above with respect to FIGS. 12 and 13.

Seedlayer 182 is electroplated up within cavity 186 of plating mold 184 to form flexure bodies 152, 154. Flexure bodies 152 and 154 include lateral beam structures, basically cantilever beam, including beam structures 152a and 152b in FIGS. 26-36. A first portion 188 of each beam structure including first anchor point 160, extends from slider wafer 174. A second portion 190 of each beam structure is built up from sacrificial layer 176 and extends from first portion 188. Second portion 190 includes second anchor portion 162. Later in the fabrication process sacrificial layer 176 is removed and a gap is formed between second portion 190 of each beam structure and slider wafer 174. Beam structure 152a is a side view of the beam structure, including first portion 188 and second portion 190. Beam structure 152b is an end view of the beam structure, including second portion 190, which is not anchored to slider wafer 174. Flexure bodies 152 and 154 have a height in the range of about 5 microns to about 55 microns, and most preferably in the range of about 10 microns to about 20 microns.

Figure 27:
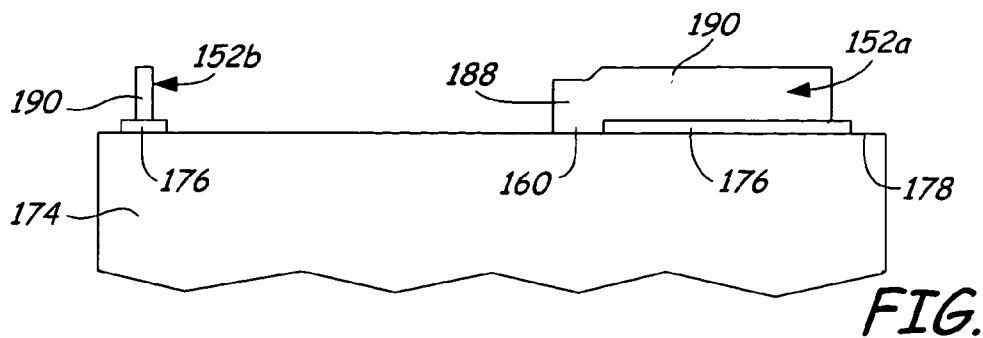

In FIG. 27, plating mold 184 is removed from slider wafer 174 and seedlayer 182. In addition, seedlayer 182 is removed from top surface 178 of slider wafer 174 and sacrificial layer 176. Plating mold 184 is chemically stripped off slider wafer 174 and the remaining thin metal seedlayer 182 is ion milled, blasted, or etched off top surface 178 of slider wafer 174. After removing plating mold 184 and seedlayer 182, the width of flexure bodies 152 and 154 may optionally be reduced, for example, by either RIE, an ion mill, or a wet etch.

Flexure bodies 152 and 154 include a plurality of folded beam structures including beam structures 152a and 152b. Each flexure body has at least one first anchor point 160 connected to slider wafer 174 and at least one second anchor point 162 for connection to transducer body 36. Beam structures 152a and 152b are flexible in a direction parallel to the disc surface and in a direction perpendicular to the disc surface to provide movement of transducer body 36 to position transducing head 42 and adjust the fly-height of transducing head 42.

Figure 28:
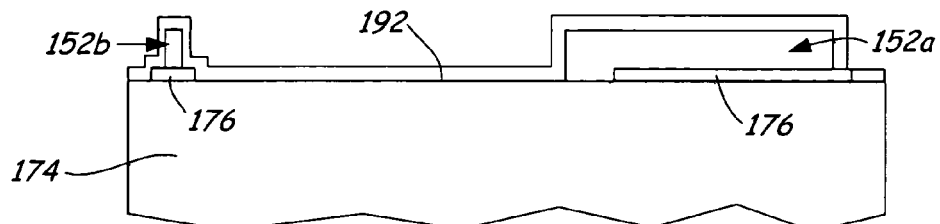

In FIG. 28, a second sacrificial layer 192 is deposited upon slider wafer 174 to completely surround and conform to beam structures 152a and 152b. One method to deposit sacrificial layer 192 is sputter deposition, such as PECVD.

Figure 29:
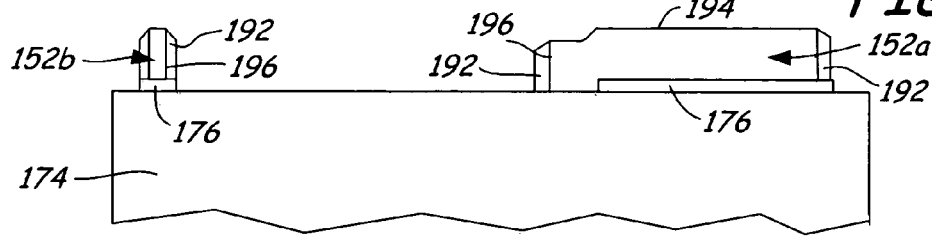

In FIG. 29, sacrificial layer 192 deposited on the horizontal surfaces of slider wafer 174 and beam structures 152a, 152b (i.e., top surface 178 and top surfaces 194) is removed, for example by a directional ion mill perpendicular to wafer surface 178. The only remaining sacrificial material 192 is located on sides 196, or the vertical surfaces, of beam structures 152a, 152b. Sacrificial layer 192 conforms to sides 196 of beam structures 152a, 152b to form sacrificial side wall 156, or a sheath of sacrificial material 192 around the flexure bodies. The ion mill does not remove sacrificial layer 192 from vertical surfaces 196 of beam structures 152a, 152b or first sacrificial layer 176.

Although not shown in the fabrication process described in FIGS. 24-36, after the ion mill step (shown in FIG. 29) to remove sacrificial layer 192 from the horizontal surfaces of slider wafer 174, bond pads may be formed on top surface 178 of slider wafer 174 using a fabrication process similar to the process described above with respect to FIGS. 12 and 13. In particular, bond pads formed at this point during the fabrication process are composed of a different material than the flexure body material. Bond pads formed with the same material as the flexure bodies are fabricated at the same time as the flexure bodies.

Figure 30:
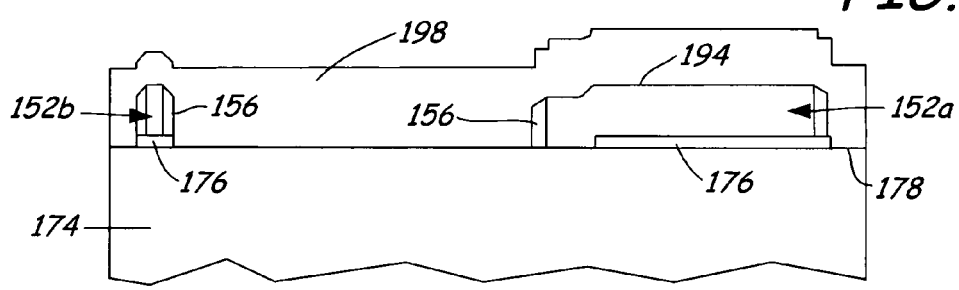

In FIG. 30, a basecoat material 198 is deposited on wafer surface 178 to backfill the plated region. Basecoat 198 surrounds sacrificial side wall 156 of beam structures 152a, 152b and fills in slider wafer 174. Basecoat 198 is composed of alumina, or the like. The deposited basecoat 198 overfills the height of beam structures 152a, 152b.

Figure 31:
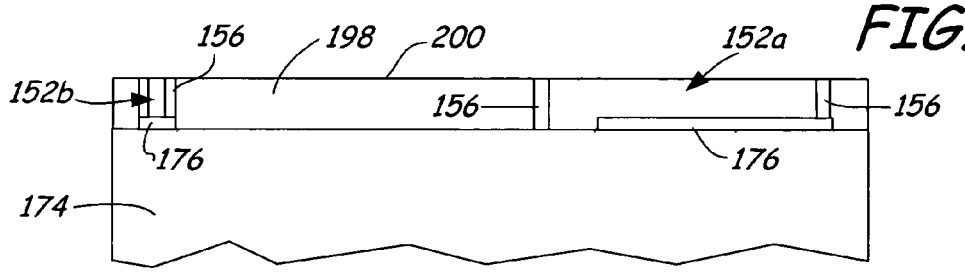

In FIG. 31, basecoat 198, beam structures 152a, 152b and sacrificial layer 192 are planarized to form a smooth surface 200 for building a microactuator and transducer body 36. Planarized surface 200 results in a smooth wafer topography to build stator electrodes 168 and transducer body 36. In further embodiments of the present invention, additional adhesion materials or steps are used to promote adhesion between flexure bodies 152, 154 with transducer body 36. Beam structures 152a, 152b have a height in the range of about 5 microns to about 25 microns, and most preferably in the range of about 10 microns to about 20 microns. Later in the fabrication process, first and second sacrificial layers 176 and 192 are removed to form a gap 202, between beam structures 152a, 152b and slider wafer 174, and a gap 204 between beam structures 152a, 152b and basecoat. Gaps 202 and 204 (shown in FIG. 36) provide mechanical freedom of beam structures 152a, 152b to effect movement and displacement of transducer body 36 of slider assembly 32.

Figure 32:
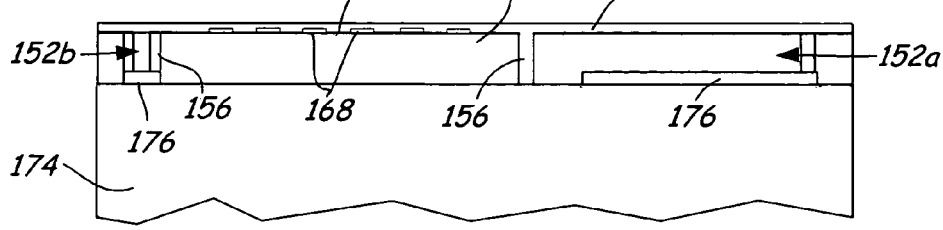
Figure 33:
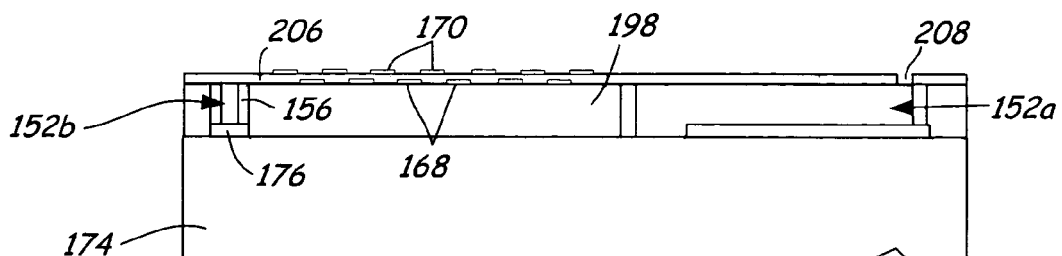

In FIG. 32, stator electrodes 168 are patterned upon planarized wafer surface 200. A third sacrificial layer 206 is deposited upon stator electrodes 168 and planarized surface 200, including basecoat 198, second sacrificial layer 192, and beam structures 152a, 152b. In FIG. 33, rotor electrodes 170 are deposited upon sacrificial layer 206. Although not shown in FIG. 33, at this step, a top gap silicon is deposited over flying leads to electrically connect bond pads 52 to transducing head 42 formed in rotor portion 36. Vias 208 are etched in sacrificial layer 206 to second anchor points 162 of beam structures 152a and 152b. Vias 208 to second anchor points 162 provide an interconnect between beam structures 152a, 152b and rotor portion 36 of slider assembly 32.

Figure 34:
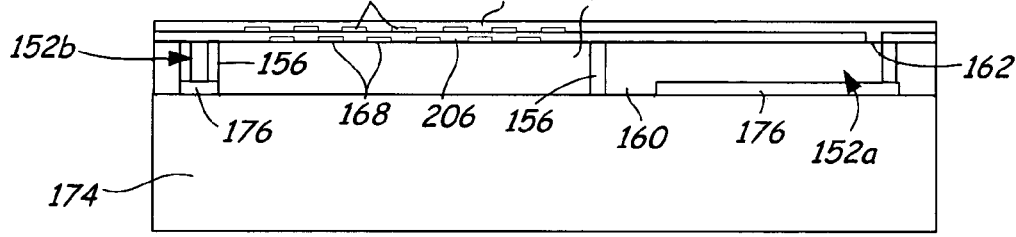

In FIG. 34, a second basecoat layer 210 is deposited upon rotor electrodes 170 and sacrificial layer 22, including with vias 208. Basecoat 210a forms a part of rotor portion 36. Basecoat 210 is also deposited within vias 208 forms an interconnect between beam structures 152a, 152b and rotor portion 36. Although not shown in FIG. 34, electrical studs are deposited from flying leads to provide a connection to transducing head 42. Basecoat 210 is planarized to provide a smooth topography for building transducing head 42 and the rest of rotor portion 36.

Figure 35:
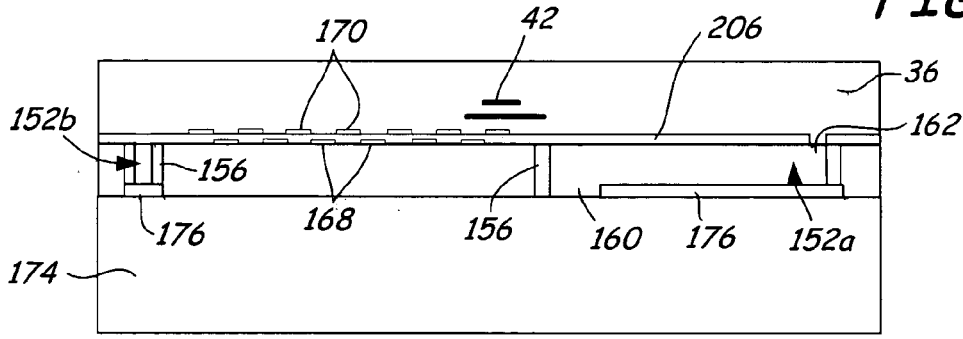
Figure 36:
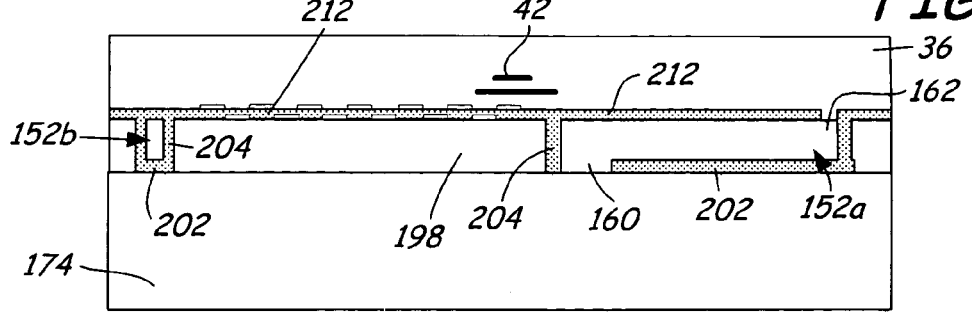

In FIG. 35, the transducing head is fabricated upon basecoat 198 by a standard slider build process and the rest of rotor portion 36 is built. In FIG. 36, sacrificial layers 176, 192 and 206 of slider assembly 32 are removed, for example by etching, to form gaps 202, 204, and 212. Examples of the sacrificial material for layers 176, 192 and 206 include silicon, silicon dioxide, germanium (or a Ge-rich SiGe), or the like. The type of etch used depends on the sacrificial material. Silicon as the sacrificial material uses a $XeF_2$ gas etch, silicon dioxide uses a HF vapor or liquid etch, and germanium (or Ge-rich SiGe) uses an $H_2O_2$ etch. Gaps 202, 204 and 212 provide mechanical freedom of beam structures 152a, 152b to move and displace transducer body 36. First gap 202 is formed between beam structures 152a, 152b and slider wafer 174, such that first anchor point 160 connects the beam structure to slider body 34, but second portion 190 of each beam structure is spaced apart from slider body 34. Second gap 204 is formed between sides 196 of beam structures 152a, 152b and basecoat 198 by removing sacrificial side wall 156. Third gap 212 is formed between beam structures 152a, 152b and basecoat 198 of slider body 34 and basecoat 210 of rotor portion 36, and between stator electrodes 168. Gap 212 creates an interdigitation of stator electrodes 168 and rotor electrodes 170 of the microactuator.

Figure 37:
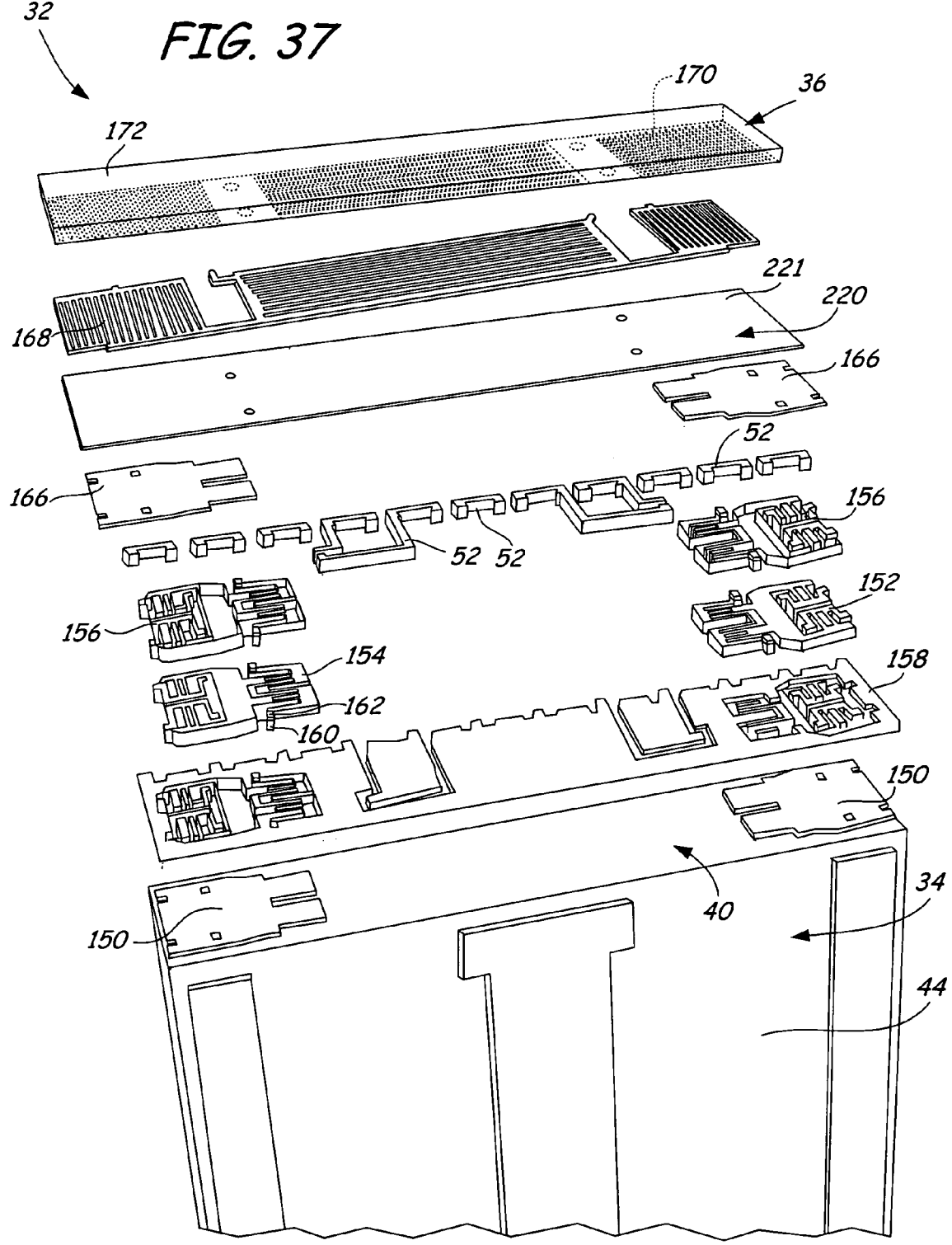
FIG. 37 is an exploded perspective view of a trailing edge portion of a slider assembly according to a further embodiment of the present invention.

FIG. 37 is an exploded perspective view of a further embodiment of slider assembly 32 according to the present invention. Slider assembly 32 includes slider body 34, sacrificial layer 150, flexure bodies 152 and 154, sacrificial side wall 156, basecoat 158, bond pads 52, a sacrificial layer 166, an insulating top coat 220, stator electrodes 168, rotor electrodes 170 and rotor insulating layer 172 (although transducing head 42 is not shown for clarity. The embodiment shown in FIG. 37 is similar to the embodiment shown in FIG. 22, however, sacrificial layer 166 is patterned to cover flexure bodies 152,154 only and insulating top coat 220 is deposited over sacrificial layer 166, basecoat 158 and flexure bodies 152, 154 to provide a larger surface for building stator electrodes 168. Rather than building stator electrodes 168 on basecoat 158, stator electrodes 168 are built upon top coat 220 (which is composed of the same material as basecoat 158), which provides a larger surface than basecoat 158 for building stator electrodes 168 (i.e., surface 221 defined by top coat 220 is about the size of wafer surface 174. Flexure bodies 152, 154 are covered by sacrificial layer 166 so that stator electrodes 168 can be built above the flexure bodies, rather than around the flexure bodies on basecoat 158.

Figure 38:
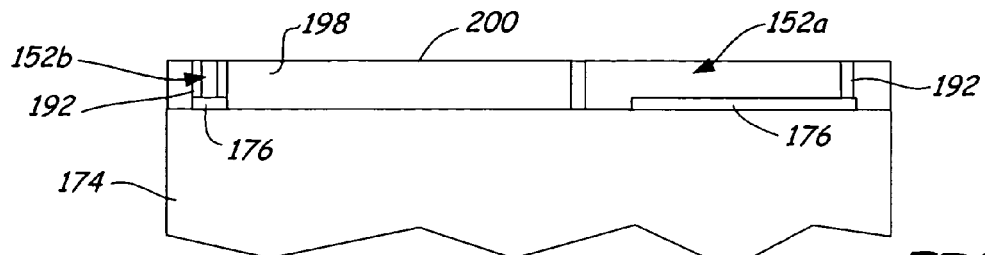
FIGS. 38-43 are diagrams illustrating a process for fabricating the slider assembly according to the embodiment of the present invention shown in FIG. 37.

FIGS. 38-43 are diagrams illustrating a process flow for fabricating slider assembly 32 shown in FIG. 37. The fabrication process for the slider assembly shown in FIG. 37 follows the same steps described above and shown in FIGS. 24-31, thus those steps are not discussed in detail below. FIG. 38 illustrates the fabrication process beginning with FIG. 31 and continuing therefrom. The diagrams shown in FIGS. 38-43 are simplified so that the general process flow for forming slider assembly 32 is clearly illustrated, thus some features of slider assembly 32 are not shown to more clearly illustrate the present invention. As the process flow is described, differences from the embodiment shown in FIGS. 37 are specifically explained. Although the diagram of FIGS. 38-43 illustrate the formation of a single slider assembly, it will be understood by those skilled in the art that fabrication will preferably occur at the wafer level, before singulation of individual slider assemblies, for improved efficiency.

Figure 39:
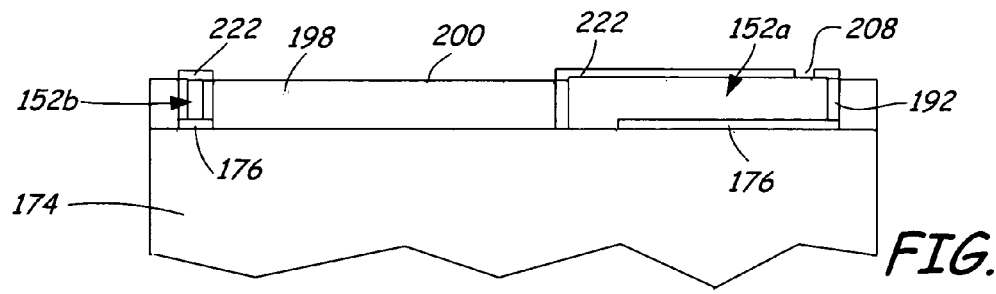

In FIG. 38, basecoat 198, sacrificial layer 192, and beam structures 152a, 152b are planarized to form smooth surface 200 for building the microactuator and transducer body 36. In FIG. 39, a sacrificial layer 222 is deposited upon planarized surface 200. Sacrificial layer 222 is patterned to cover top surface 194 of beam structures 152a, 152b. Basecoat 198 is exposed and via 208 is patterned to expose beam structure 152a, thereby providing a connection path from transducer body 36 to the flexure bodies.

Figure 40:
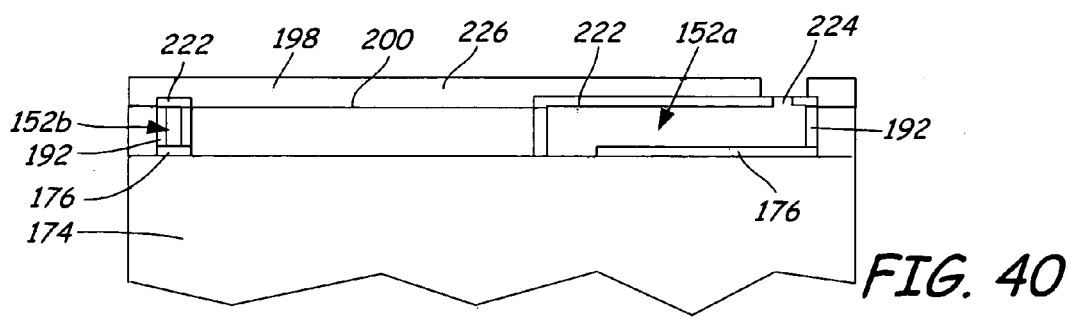

In FIG. 40, spring contact 224 is plated within vias 208. A photoresist 226 is deposited upon basecoat 198 and sacrificial layer 222. Photoresist 226 is patterned to form a mold for plating spring contact 224, which forms second anchor point 162 of beam structure 152a. Beam structure 152a is electroplated and the metal beam structure grows within via 208 to form spring contact 224. Photoresist mold 226 is removed from basecoat 198 and sacrificial layer 222. In further embodiments, beam structure 152a and second anchor point 162 are plated in a single step using a single plating mold photo process.

Figure 41:
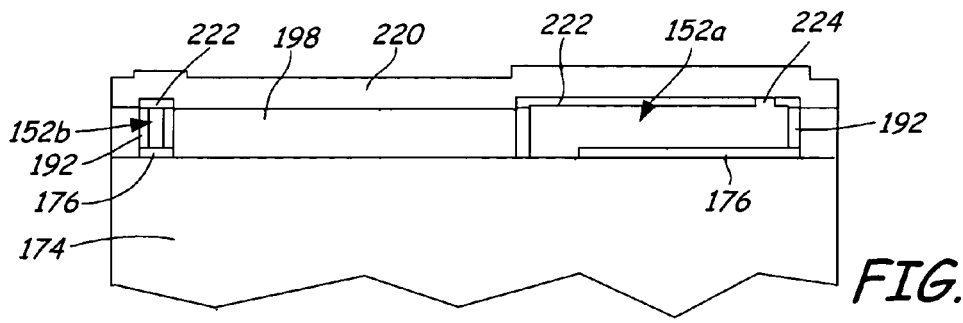
Figure 42:
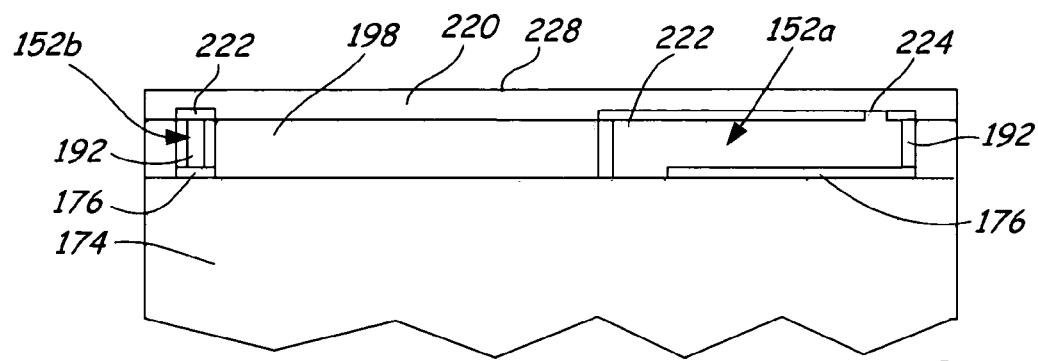

In FIG. 41, additional basecoat material is deposited upon slider wafer 174, including sacrificial layer 222 to form top coat 220. In FIG. 42, top coat 220 is planarized again to form a smooth surface 228 topography for building stator electrodes 168 and transducer body 36.

Figure 43:
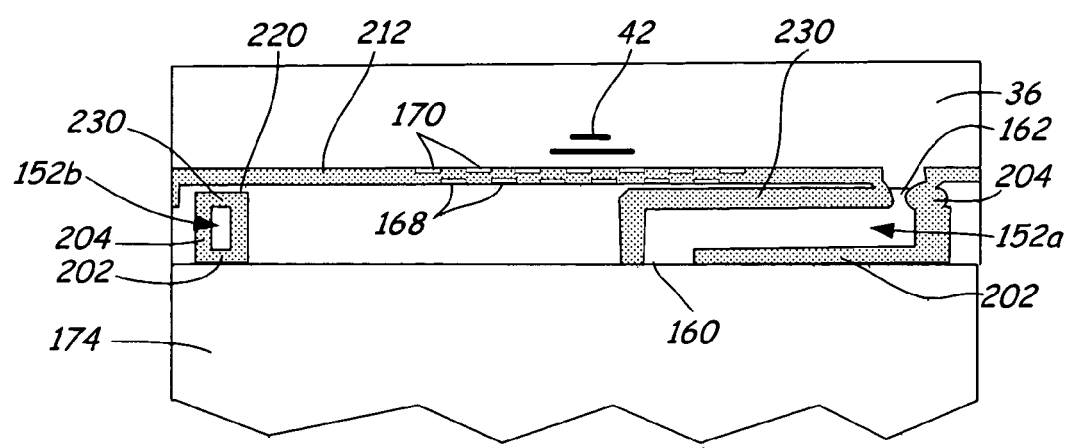

FIG. 43 is a diagram illustrating slider assembly 32, including stator electrodes 168, rotor electrodes 170 and transducer body 36, with transducing head 42 built upon top coat 220. Stator electrodes 168, rotor electrodes 170 and transducer body 36 are fabricated according to the process described above with respect to FIGS. 32-36. In particular, stator electrodes 168 are deposited on top coat 220. Sacrificial layers 176, 192, and 222 are removed to form gaps 202, 204, 212 and 230, for example by an etch. Examples of the sacrificial material for layers 176, 192 and 222 include silicon, silicon dioxide, germanium (or a Ge-rich SiGe), or the like. The type of etch used depends on the sacrificial material, for example, silicon as the sacrificial material uses a $XeF_2$ gas etch, silicon dioxide uses a HF vapor or liquid etch, and germanium (or Ge-rich SiGe) uses an $H_2O_2$ etch. Gaps 202, 204, and 230 space beam structures 152a, 152b away from slider body 34, top coat 220, and basecoat 198 to provide mechanical freedom of the flexure bodies to move and displace transducer body 36. First anchor point 160 connects beam structures to slider body 34 and second anchor point 162 connects beam structures 152a, 152b to transducer body 36. Gap 212 creates an interdigitation of the stator electrodes 168 and rotor electrodes 170 of the microactuator.

The present invention is a slider assembly including a transducer-level microactuator for selective movement of a transducer portion of the slider assembly with respect to a slider body to radially position a transducing head over circumferential data tracks of a rotatable disc. In addition, an improved process for fabricating the transducer-level microactuator and the slider assembly is disclosed. In the present invention, the slider assembly includes a slider body with spring flexures fabricated upon the trailing edge of the slider body. The transducer body is connected to opposite ends of the spring flexures. The spring flexures are fabricated using plated metal on an $Al_2O_3TiC$ slider wafer substrate, which allows nearly standard transducer fabrication and slider fabrication upon the wafer substrate. In further embodiments of the present invention, additional adhesion materials or steps are used to promote adhesion between the slider wafer substrate and the spring flexures and/or the spring flexures and the transducer body. For example, an adhesion layer or a material selective etch to create a rough-porous adhesive interface may be used to promote adhesion. A basecoat substantially surrounds the spring flexures, however, during fabrication a sacrificial layer is used to form a gap between the spring flexures and the basecoat to provide mechanical freedom for the spring flexures to move the transducer body with respect to the slider body.

The slider assembly of the present invention may be made from a standard $Al_2O_3TiC$ slider wafer, or other suitable material, rather than using a reactive ion etching of a silicon wafer. The spring flexures and bond pads are not built from etching the slider wafer substrate, but rather, are built upon the trailing edge of the slider body using a plating process. Thus, the present invention slider assembly is more robust and less likely to break during the use.

Although the present invention has been described with reference to preferred embodiments, workers skilled in the art will recognize that changes may be made in form and detail without departing from the spirit and scope of the invention.

The invention claimed is:

1. A slider comprising:
    a slider body having a leading edge and a uniplanar trailing edge;
    a transducer body spaced from the trailing edge of the slider body, the transducer body including at least one transducer element;
    a flexure body extending from the trailing edge of the slider body, the flexure body having a first anchor point connected to the slider body and second anchor point connected to the transducer body;
    a basecoat layer deposited on the trailing edge of the slider body, the basecoat layer substantially surrounding the flexure body and separated from the flexure body by a first gap;
    a first actuation means formed on the basecoat layer; and
    a second actuation means formed on the transducer body adjacent the slider body.

2. The slider of claim 1 wherein the flexure body is a flexible column.

3. The slider of claim 2 wherein the first anchor point of the flexible column has a width greater than the second anchor point of the flexible column.

4. The slider of claim 1 wherein the flexure body is a folded beam structure.

5. The slider of claim 4, and further comprising a second gap to space the folded beam structure from the slider body.

6. The slider of claim 1 wherein the first actuation means comprises an electromagnetic coil and the second actuation means comprises a permanent magnet film.

7. The slider of claim 1 wherein the first actuation means comprises a permanent magnet film and the second actuation means comprises an electromagnetic coil.

8. The slider of claim 1, and further comprising an adhesive interface between the slider body and the first anchor point of the flexure body.

9. The slider of claim 8 wherein the adhesive interface comprises a two grain material deposited and etched on a portion of the trailing edge of the slider body.

10. The slider of claim 1 wherein the flexure body has a height in the range of about 5 microns to about 55 microns.

11. The slider of claim 1 wherein the slider body is composed of alumina titanium carbide.

12. The slider of claim 1 wherein the flexure body is composed of metal.

13. The slider of claim 1 wherein the basecoat layer is composed of alumina.

14. A slider comprising:
a stator portion having a leading edge and a uniplanar trailing edge;
a spring flexure formed on the trailing edge of the stator portion, the spring flexure having a first end and a second end wherein the first end is attached to the stator portion;
a basecoat deposited on the trailing edge of the stator portion and surrounding sides of the spring flexure wherein a gap is formed between the basecoat and the spring flexure;
a rotor portion connected to the second end of the spring flexure, the rotor portion carrying a transducing head; and
an actuation mechanism for moving the rotor portion with respect to the stator portion.

15. The slider of claim 14 wherein the spring flexure is a flexible column.

16. The slider of claim 14 wherein the spring flexure is a cantilever beam, and further wherein the rotor portion is attached to a portion of the second end of the cantilever beam.

17. The slider of claim 16 wherein the cantilever beam is spaced from the basecoat and the stator portion by the gap.

18. The slider of claim 17 wherein the second end of the cantilever beam is spaced from the stator portion by the gap.

19. The slider of claim 14 wherein the first end of the spring flexure has a width greater than a width of the second end of the spring flexure.

20. The slider of claim 14 wherein the spring flexure is plated on the stator portion.

21. The slider of claim 14 wherein the actuation mechanism comprises a plurality of stator electrodes on the basecoat and a plurality of rotor electrodes on the rotor portion suspended between the stator electrodes.

22. The slider of claim 14, and further comprising a bond pad extending from the trailing edge of the stator portion.

23. The slider of claim 14 wherein an adhesion material connects the rotor portion to the spring flexure.

24. The slider of claim 14 wherein the trailing edge of the stator portion is roughened to create an adhesive interface between the stator portion and the spring flexure.

25. The slider of claim 14 wherein the spring flexure is metal.

26. A slider assembly comprising:
a stator portion having a leading edge and a trailing edge;
a spring flexure extending from the trailing edge of the stator portion wherein the spring flexure is comprised of different material than the stator portion;
a basecoat deposited on the trailing edge of the stator portion and substantially surrounding the spring flexure wherein a gap substantially surrounds the spring flexure to space the basecoat from the spring flexure;
a plurality of stator electrodes on the basecoat;
a rotor portion connected to the stator portion by the spring flexure, the rotor portion carrying a transducing head; and
a plurality of rotor electrodes on the rotor portion suspended between the stator electrodes.

27. The slider assembly of claim 26 wherein the spring flexure is a flexible column having a first end connected to the stator portion and a second end connected to the rotor portion.

28. The slider assembly of claim 27 wherein the first end of the spring flexure has a width greater than a width of the second end of the spring flexure.

29. The slider assembly of claim 26 wherein the spring flexure has a first anchor point connected to the stator portion and a second anchor point connected to the rotor portion, and further wherein the gap spaces the spring flexure from the basecoat and the stator portion.

30. The slider assembly of claim 29 wherein the spring flexure is a cantilever beam.

31. The slider assembly of claim 30 wherein the basecoat surrounds and is spaced from sides of the cantilever beam.

32. The slider assembly of claim 30 and further comprising a top coat deposited upon the basecoat and a first portion of a top surface of the cantilever beam wherein the top coat is spaced apart from a second portion of the top surface of the cantilever beam.

33. The slider assembly of claim 26, and further comprising a bond pad extending from the trailing edge of the stator portion wherein the bond pad is substantially surrounded by the basecoat and a portion of the bond pad is exposed for electrical contact.

34. The slider assembly of claim 26 wherein a portion of the trailing edge of the stator portion is roughened to create an adhesive interface between the stator portion and the spring flexure.

35. The slider assembly of claim 26, and further comprising an adhesion material connecting the rotor portion to the spring flexure.

36. A slider comprising:
a stator portion having a leading edge and a trailing edge;
a spring flexure formed on the trailing edge of the stator portion, the spring flexure having a first end and a second end wherein the first end is attached to the stator portion, wherein the first end of the spring flexure has a width greater than a width of the second end of the spring flexure;
a basecoat deposited on the trailing edge of the stator portion and surrounding sides of the spring flexure wherein a gap is formed between the basecoat and the spring flexure;
a rotor portion connected to the second end of the spring flexure, the rotor portion carrying a transducing head; and
an actuation mechanism for moving the rotor portion with respect to the stator portion.

* * * * *

UNITED STATES PATENT AND TRADEMARK OFFICE
CERTIFICATE OF CORRECTION

PATENT NO. : 7,277,257 B2 Page 1 of 1
APPLICATION NO. : 10/729472
DATED : October 2, 2007
INVENTOR(S) : Roger L. Hipwell, Jr. et al.

It is certified that error appears in the above-identified patent and that said Letters Patent is hereby corrected as shown below:

Column 9, Line 13, delete "bondpads", and insert --bond pads--

Signed and Sealed this

Fourth Day of March, 2008

JON W. DUDAS
*Director of the United States Patent and Trademark Office*